(12) United States Patent
Miyakawa

(10) Patent No.: US 8,918,894 B2
(45) Date of Patent: Dec. 23, 2014

(54) INFORMATION PROCESSING SYSTEM, ANONYMIZATION METHOD, INFORMATION PROCESSING DEVICE, AND ITS CONTROL METHOD AND CONTROL PROGRAM

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 32 days.

(21) Appl. No.: 13/884,207

(22) PCT Filed: Nov. 14, 2011

(86) PCT No.: PCT/JP2011/076610
§ 371 (c)(1),
(2), (4) Date: May 8, 2013

(87) PCT Pub. No.: WO2012/067213
PCT Pub. Date: May 24, 2012

(65) Prior Publication Data
US 2013/0239226 A1    Sep. 12, 2013

(30) Foreign Application Priority Data

Nov. 16, 2010  (JP) ................................. 2010-256045

(51) Int. Cl.
| H04L 9/00 | (2006.01) |
| G06F 21/62 | (2013.01) |
| H04L 29/06 | (2006.01) |
| G06Q 10/10 | (2012.01) |

(52) U.S. Cl.
CPC ............ *G06F 21/6254* (2013.01); *H04L 63/10* (2013.01); *G06Q 10/103* (2013.01); *H04L 63/0407* (2013.01)
USPC ........................................................ 726/26

(58) Field of Classification Search
USPC ................. 726/1, 26; 713/164, 165, 166, 167
See application file for complete search history.

(56) References Cited

U.S. PATENT DOCUMENTS

| 7,797,725 B2 | 9/2010 | Lunt et al. | |
| 8,635,679 B2 * | 1/2014 | Hardt | ................................ 726/6 |

(Continued)

FOREIGN PATENT DOCUMENTS

| JP | 2009-087216 A | 4/2009 |
| JP | 2009-146121 A | 7/2009 |
| JP | 2010-086179 A | 4/2010 |

OTHER PUBLICATIONS

Benjamin C.M. Fung, et al., "Privacy-Preserving Data Publishing: A Survey of Recent Developments", ACM Computing Surveys, Jun. 2010, pp. 14:1-14.53, vol. 42, No. 4, <DOI:10.1145/1749603.1749605>, Section 5.1.1.

(Continued)

*Primary Examiner* — Beemnet Dada
(74) *Attorney, Agent, or Firm* — Sughrue Mion, PLLC

(57) ABSTRACT

An information processing device for anonymizing personal information being linkable to an individual includes an anonymization policy providing unit which provides an anonymization policy in which priority is added to each of a plurality of kinds of anonymization processes to enhance anonymity for at least one item which can be related to said personal information; an anonymization process selecting unit which selects in sequence from an anonymization process of low priority to an anonymization process of high priority, in case said plurality of kinds of anonymization processes being contained in said anonymization policy which said anonymization policy providing unit provides is applied; an anonymization processing unit which applies said plurality of kinds of anonymization processes in said sequence selected by said anonymization process selecting unit to said personal information which an information user uses; and an anonymity evaluating unit which provides said personal information to which said anonymization process was applied up to the anonymization process concerned to said information user, in case it is judged that said personal information to which said anonymization process was applied had anonymity.

11 Claims, 30 Drawing Sheets

(56) References Cited

U.S. PATENT DOCUMENTS

2004/0199781 A1* 10/2004 Erickson et al. ............. 713/200
2006/0123461 A1   6/2006 Lunt et al.
2012/0197915 A1*  8/2012 Miyakawa ................... 707/755
2014/0040289 A1*  1/2014 Miyakawa ................... 707/755

OTHER PUBLICATIONS

Bhume Bhumiratana, et al., "Privacy Aware Data Sharing: Balancing the Usability and Privacy of Datasets", Proceedings of the 2nd International Conference on Pervasive Technologies Related to Assistive Environments (PETRA ''09), Jun. 9, 2009, <DOI:10.1145/1579114.1579187>, Sections 6.2-6.6.

Kathleen Benitez, et al., "Beyond Safe Harbor: Automatic Discovery of Health Information De-identification Policy Alternatives", Proceedings of the 1st ACM International Health Informatics Symposium (IHI '10), Nov. 11, 2010, pp. 163-172, <DOI:10.1145/1882992.1883017>, Section 2.4.1.

Information Grand Voyage Project Consortium, Building of a personal data anonymization platform User's Manual, Japan Information Processing Development Corporation, Feb. 23, 2009, URL:http://www.meti.go.jp/policy/it_policy/daikoukai/igvp/cp2_jp/common/2008_c_4, Section 6.4.1.

* cited by examiner

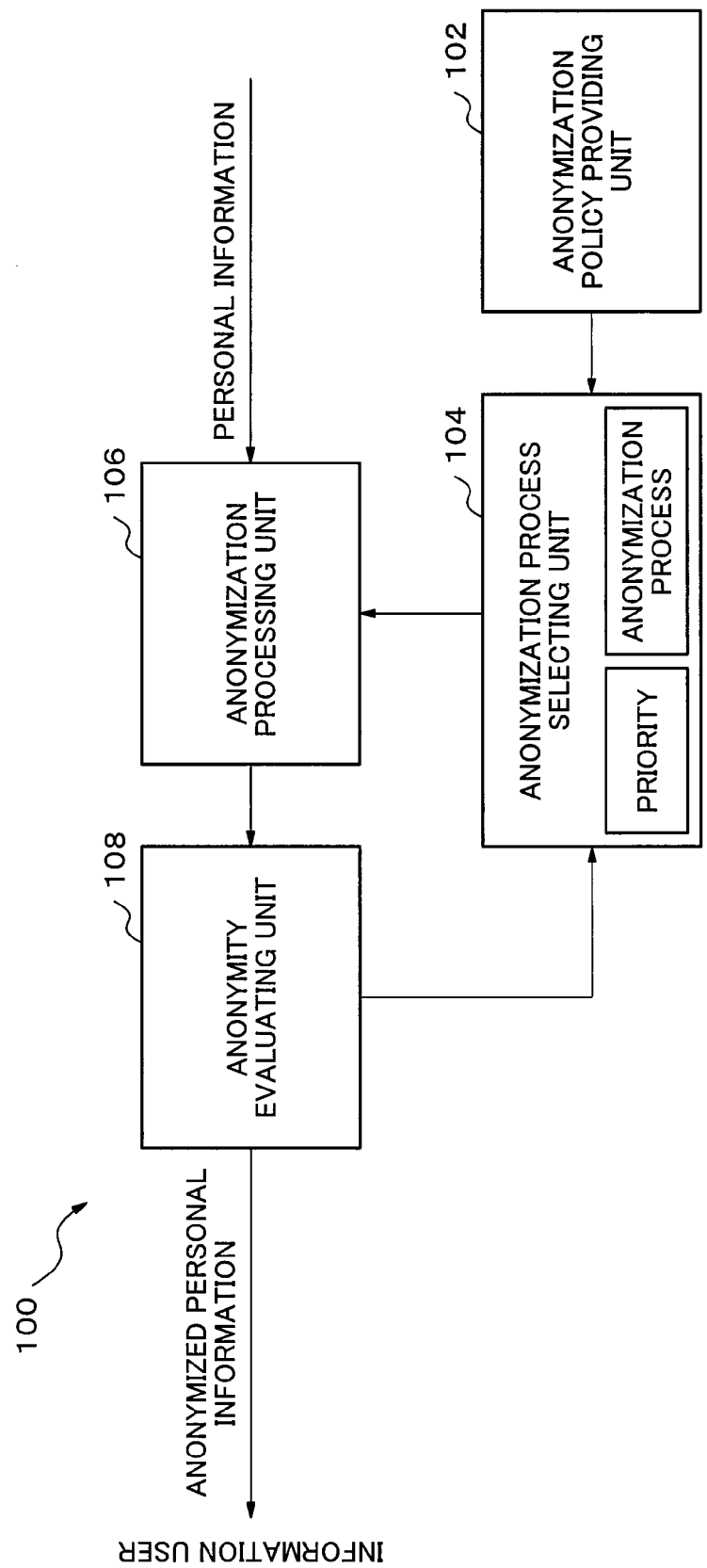

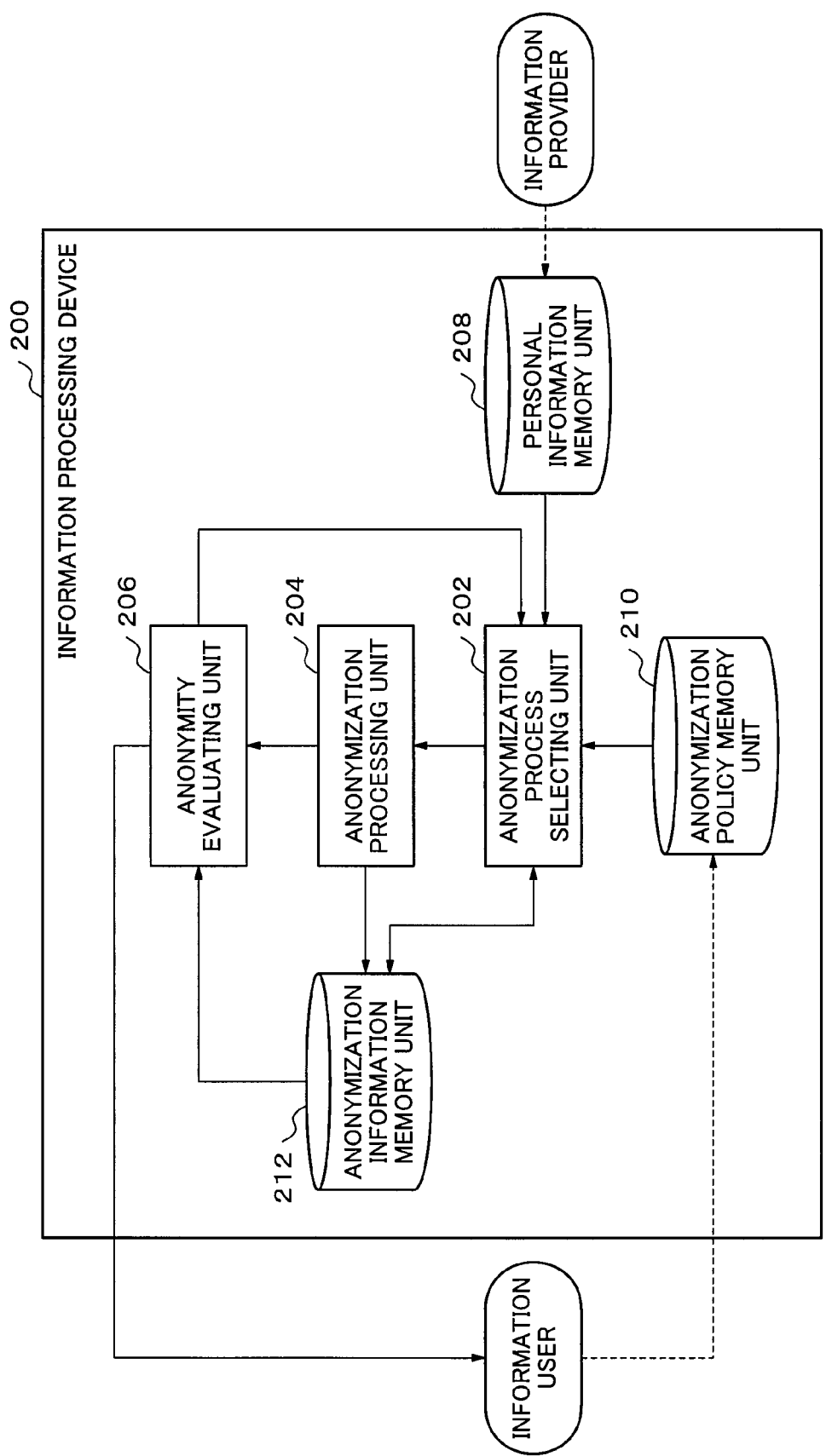

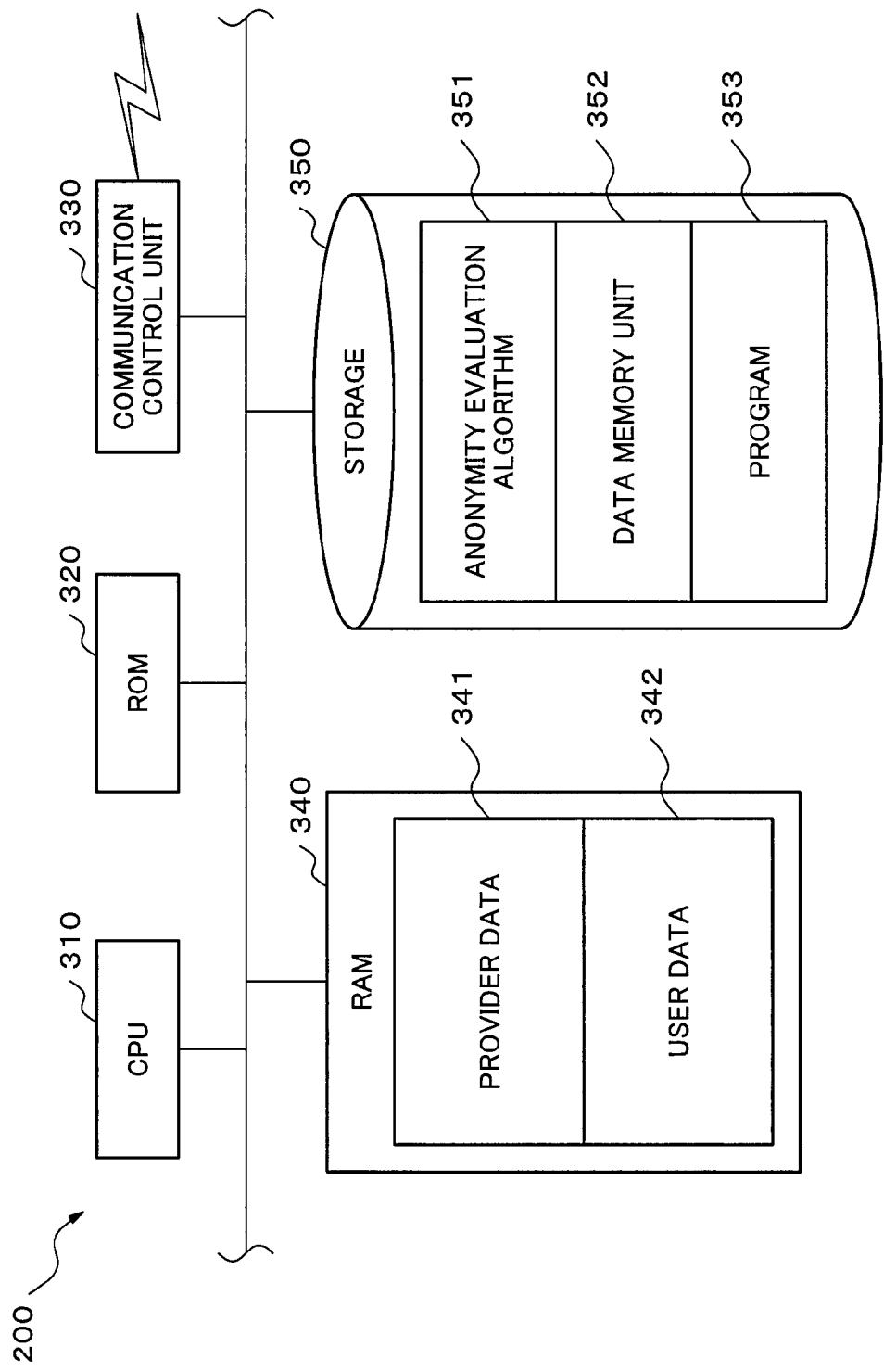

Fig.4

| PERSONAL ID 401 | BLOOD RELATIONSHIP (NAME) 402 | ADDRESS 403 | AGE 404 | MEDICAL HISTORY 405 | ... |
|---|---|---|---|---|---|
| 001 | YAMADA TAKAO | 4 TSUKIJI-CHO, SHINJUKU-KU, TOKYO | 56 | •K-ITIS<br>•B-OSIS | |
| 002 | YAMAMOTO RYOKO | 5-7-1 SHIBA, MINATO-KU, TOKYO | 18 | •C-ITIS | |
| ... | ... | ... | ... | ... | |

| ITEM | INDEX 1 | INDEX 2 | INDEX 3 | INDEX 4 | ... |
|---|---|---|---|---|---|
| BLOOD RELATIONSHIP (NAME) | ALL DESCRIBED | NONE (SYMBOL) | | | |
| ADDRESS | ALL DESCRIBED | OTHER THAN HOUSE NUMBER | PREFECTURE NAME ONLY | NONE | |
| AGE | ALL DESCRIBED | AGE GROUP ONLY | NONE | | |
| MEDICAL HISTORY | ALL DESCRIBED | EXCEPT SPECIAL CASE | NONE | | |
| ... | ... | ... | ... | ... | |

Fig.6

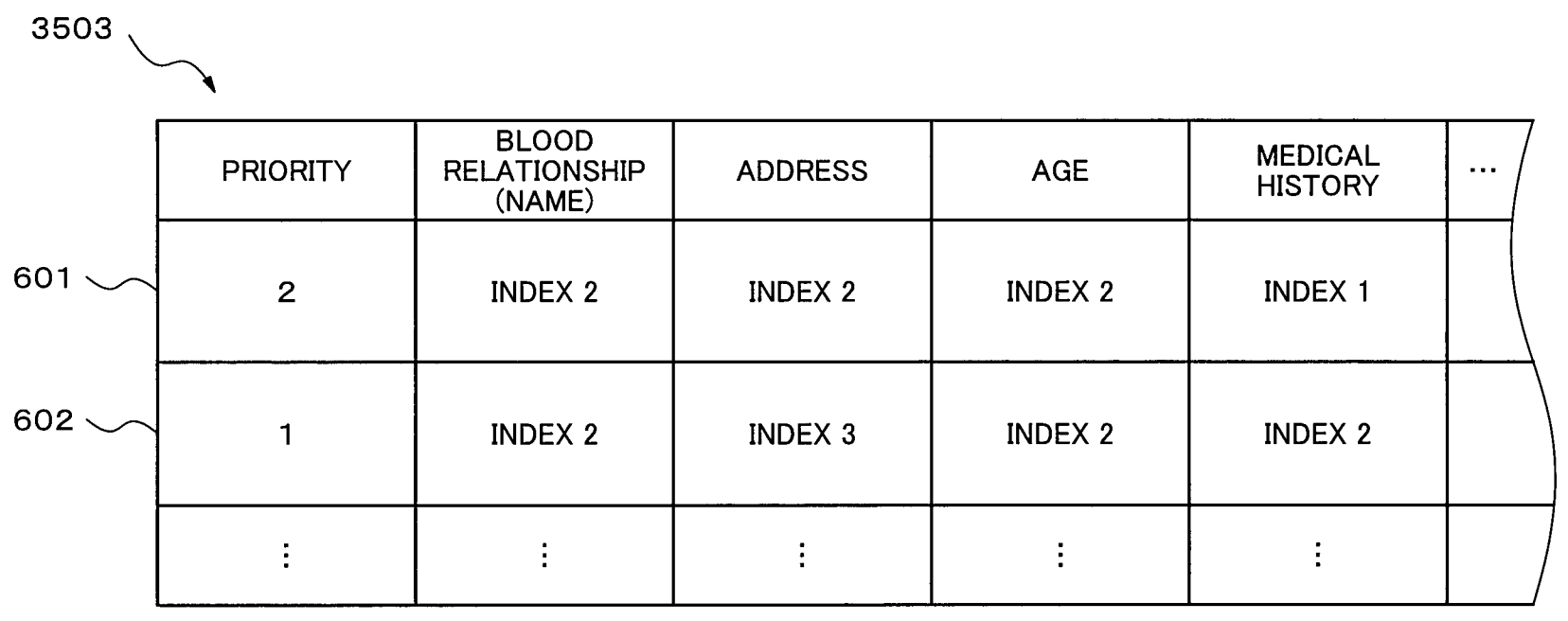

| PRIORITY | BLOOD RELATIONSHIP (NAME) | ADDRESS | AGE | MEDICAL HISTORY | ... |
|---|---|---|---|---|---|
| 2 | INDEX 2 | INDEX 2 | INDEX 2 | INDEX 1 | |
| 1 | INDEX 2 | INDEX 3 | INDEX 2 | INDEX 2 | |
| ... | ... | ... | ... | ... | |

Figure 7:
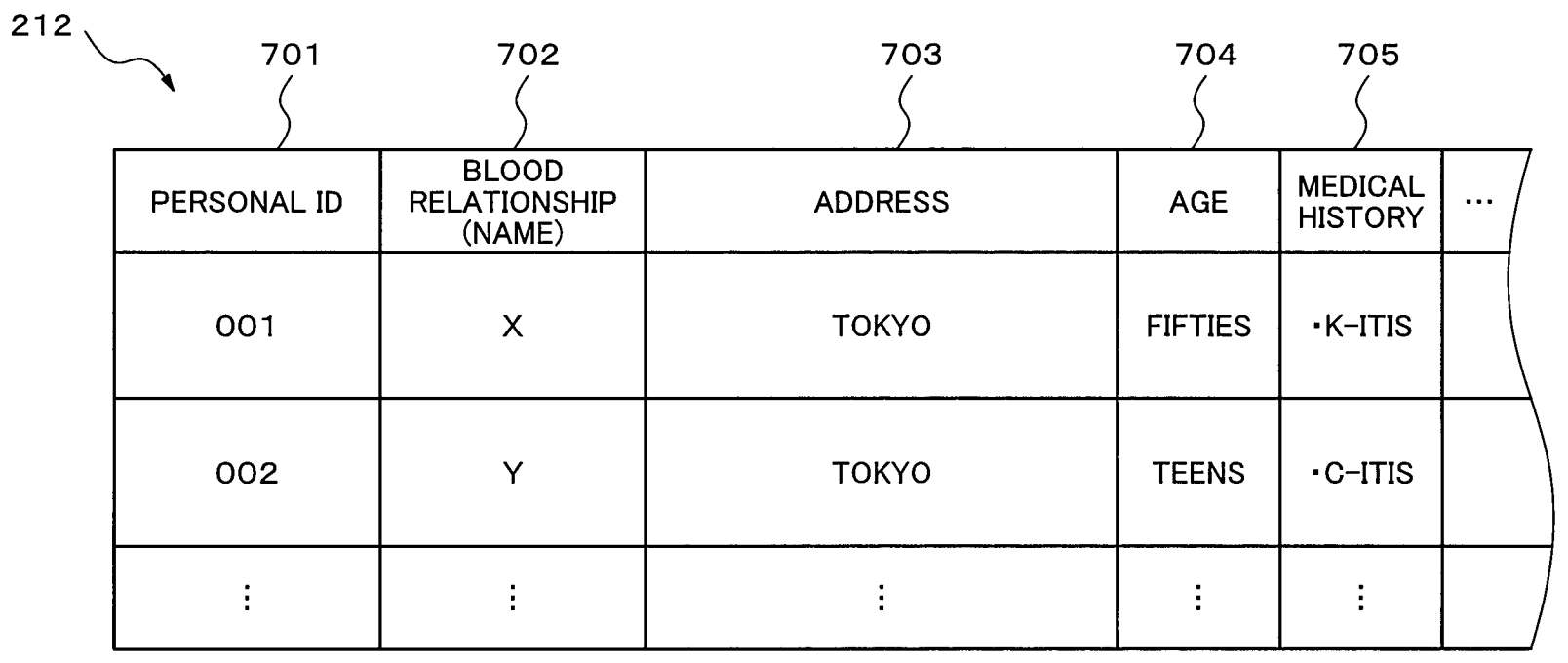

| PERSONAL ID 701 | BLOOD RELATIONSHIP (NAME) 702 | ADDRESS 703 | AGE 704 | MEDICAL HISTORY 705 | ... |
|---|---|---|---|---|---|
| 001 | X | TOKYO | FIFTIES | •K-ITIS | |
| 002 | Y | TOKYO | TEENS | •C-ITIS | |
| ... | ... | ... | ... | ... | |

Fig.13

| PRIORITY = 1 | BLOOD RELATIONSHIP (NAME) | ADDRESS | AGE | MEDICAL HISTORY | ... |
|---|---|---|---|---|---|
| 1-1 | INDEX 2 | INDEX 3 | INDEX 2 | INDEX 1 | |
| 1-2 | INDEX 2 | INDEX 3 | INDEX 2 | INDEX 2 | |

1300

602-1

602-2

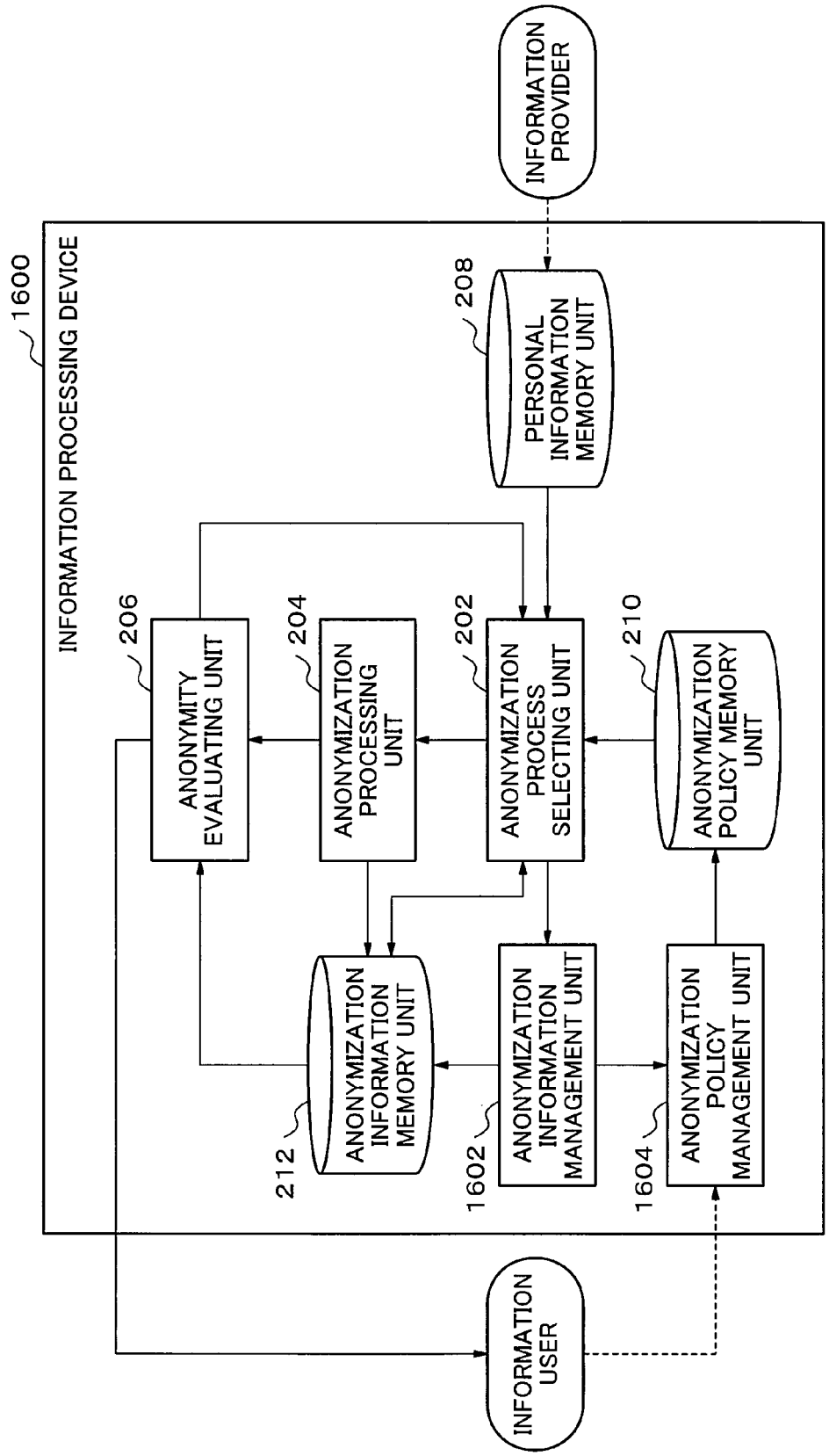

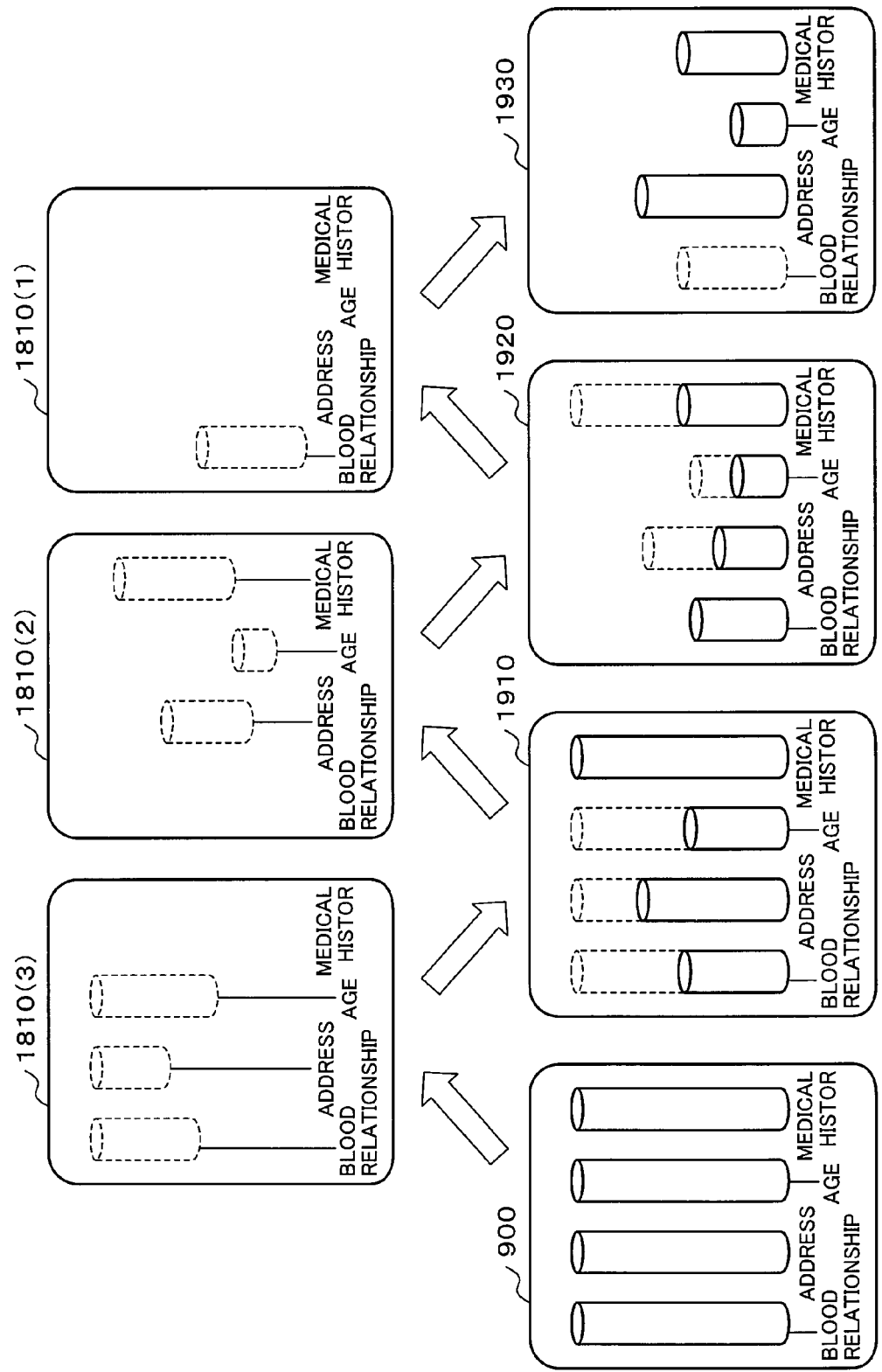

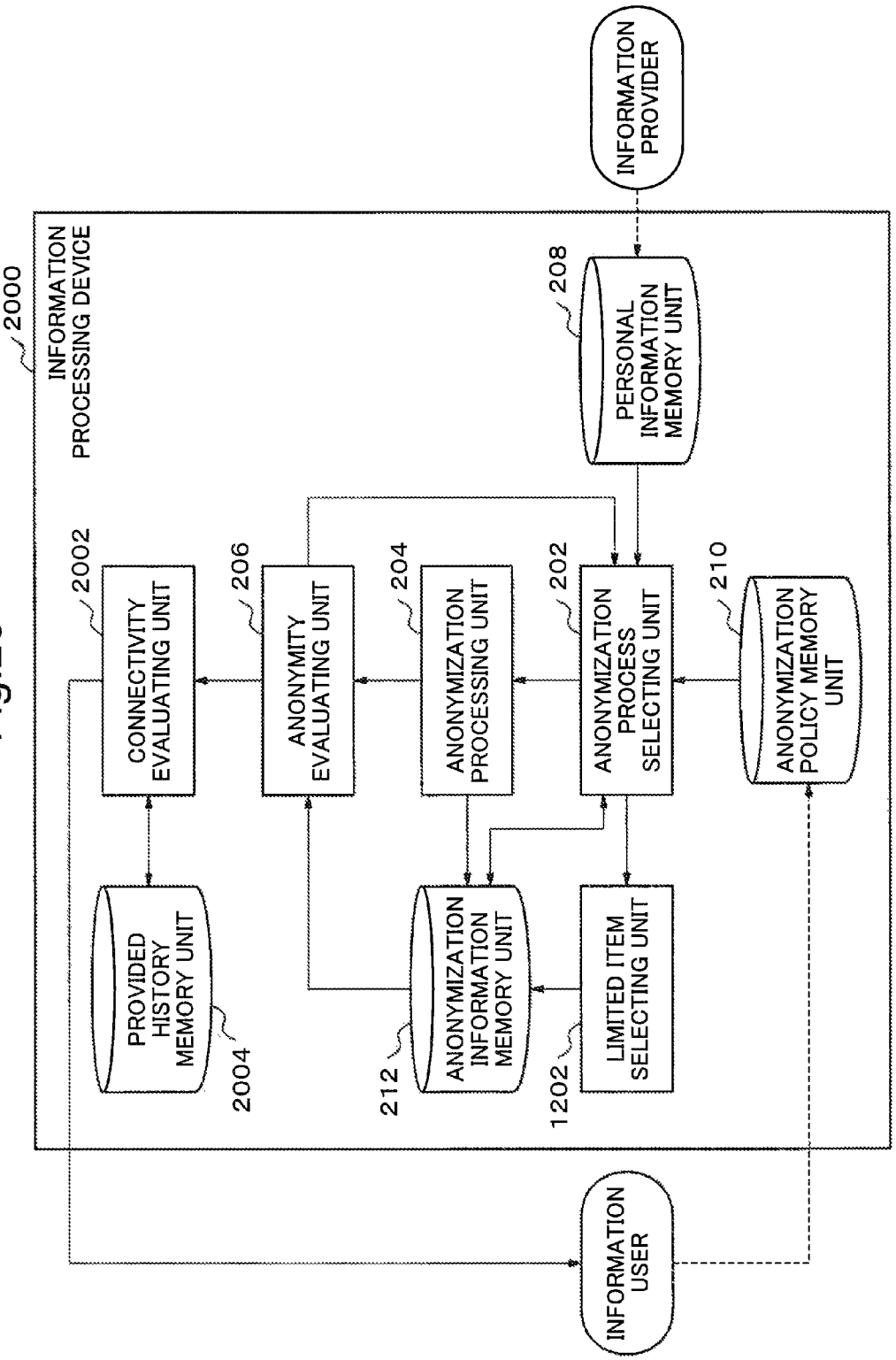

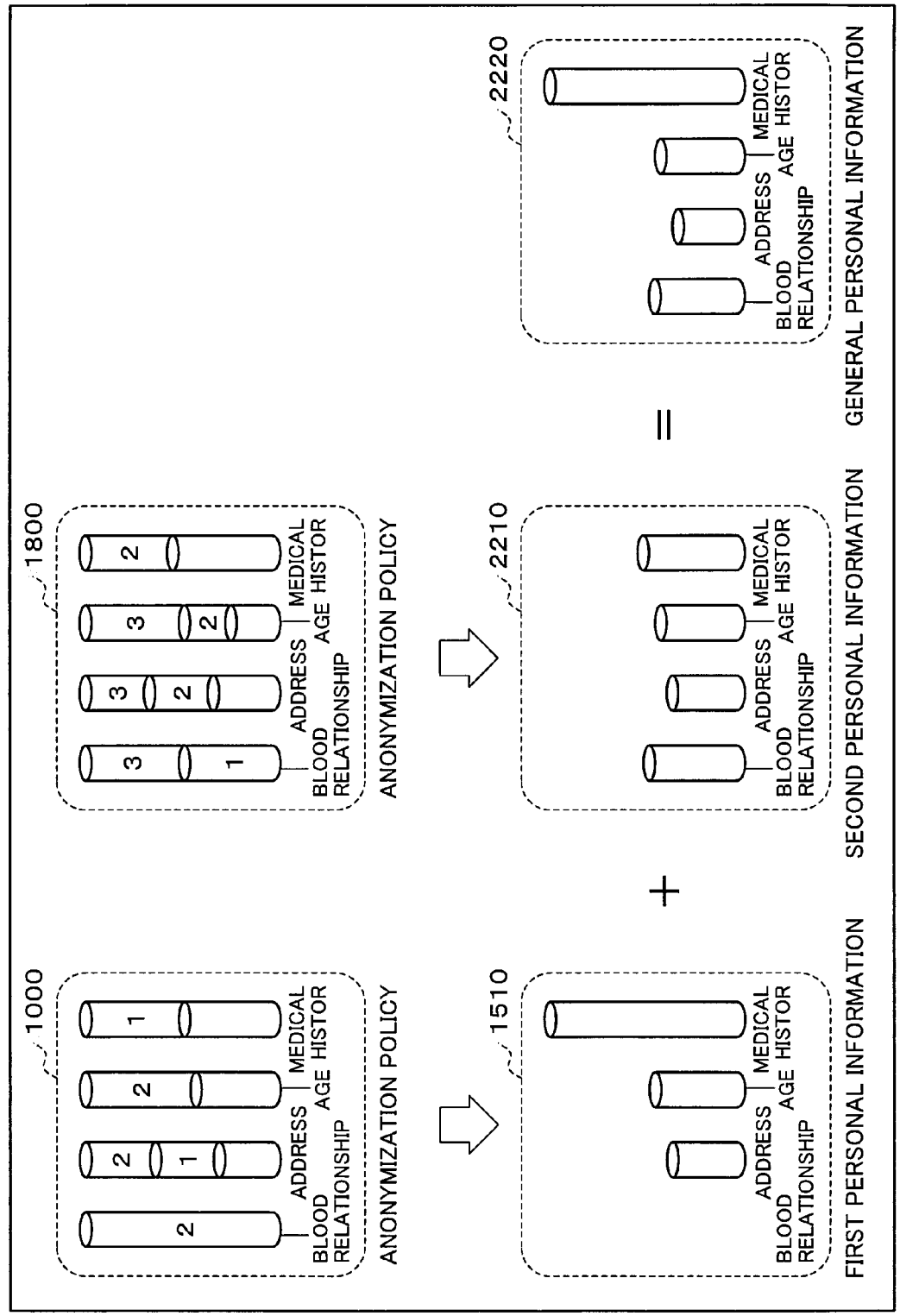

| PERSONAL ID | BLOOD RELATIONSHIP (NAME) | ADDRESS | AGE | MEDICAL HISTORY |
|---|---|---|---|---|
| 001 | X | TOKYO | FIFTIES | ·K-ITIS<br>·B-OSIS |
| 002 | Y | TOKYO | TEENS | ·C-ITIS |

2210

| 001 | YAMADA | TOKYO | FIFTIES | ·K-ITIS |
|---|---|---|---|---|
| 002 | YAMAMOTO | TOKYO | TEENS | ·C-ITIS |

2220　　　　　∥　　　　2221

| 001 | YAMADA | TOKYO | FIFTIES | ·K-ITIS<br>·B-OSIS |
|---|---|---|---|---|
| 002 | YAMAMOTO | TOKYO | TEENS | ·C-ITIS |

| PERSONAL ID | BLOOD RELATIONSHIP (NAME) | ADDRESS | AGE | MEDICAL HISTORY |
|---|---|---|---|---|
| 001 | X | TOKYO | FIFTIES | ·K-ITIS<br>·B-OSIS |
| 002 | Y | TOKYO | TEENS | ·C-ITIS |

1920

+

| 001 | YAMADA | TOKYO | ADULT | ·K-ITIS |
|---|---|---|---|---|
| 002 | YAMAMOTO | TOKYO | MINOR | ·C-ITIS |

2310 = 2311

| 001 | YAMADA | TOKYO | ADULT | ·K-ITIS<br>·B-OSIS |
|---|---|---|---|---|
| 002 | YAMAMOTO | TOKYO | MINOR | ·C-ITIS |

| 001 | YAMADA | TOKYO | FIFTIES | ·K-ITIS<br>·B-OSIS |
| --- | --- | --- | --- | --- |
| 002 | YAMAMOTO | TOKYO | TEENS | ·C-ITIS |

⇩

2310

| 001 | YAMADA | TOKYO | ADULT | ·K-ITIS<br>·B-OSIS |
| --- | --- | --- | --- | --- |
| 002 | YAMAMOTO | TOKYO | MINOR | ·C-ITIS |

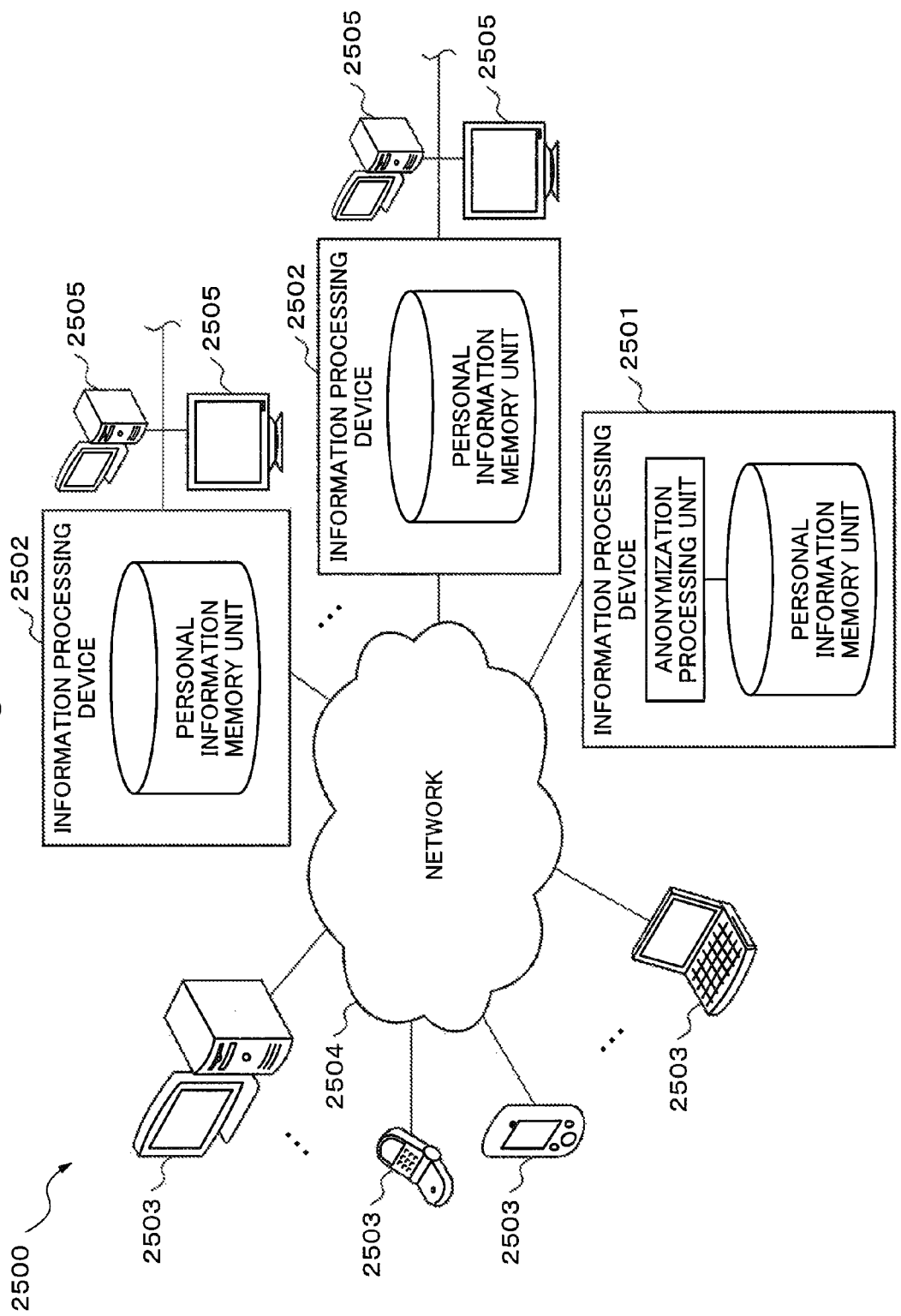

INFORMATION PROCESSING SYSTEM, ANONYMIZATION METHOD, INFORMATION PROCESSING DEVICE, AND ITS CONTROL METHOD AND CONTROL PROGRAM

CROSS REFERENCE TO RELATED APPLICATIONS

This application is a National Stage of International Application No. PCT/JP2011/076610, filed on Nov. 14, 2011, which claims priority from Japanese Patent Application No. 2010-256045, filed on Nov. 16, 2010, the contents of all of which are incorporated herein by reference in their entirety.

TECHNICAL FIELD

The present invention relates to a technology for anonymizing personal information of individuals.

BACKGROUND ART

Within the diversified information society, if service providers such as an enterprise can widely distribute users' attributes which are provided from the users and accumulated, the service providers can make more profit. On the other hand, the users can get useful services from the service providers in return of their life logs, collected by a sensing device such as a GPS (Global Positioning System) and a Wi-Fi (Wireless Fidelity), to the service providers. One of effective methods to promote distribution of personal information such as users' attributes is anonymization. The anonymization performs various anonymization processes such as generalization, truncation, perturbation, and so on to information with high privacy. By the anonymization processes, no one can distinguish individuals' information among anonymized information.

In such a technical field of the anonymization, a technology described in PTL 1 discloses: to include as a policy setting rule a plurality of conformity conditions with different priority, and in case a documents conforms to a plurality of conformity conditions, to perform operation limitation by the conformity condition with high priority. As data which shows this priority, a score value is set (in particular, refer to paragraph [0062]).

Also, a technology described in PTL 2 is, as is clear from the description of problems in paragraph [0009] of the document concerned, by making abstraction level of description (for example, name of a disease in a text of medical field) included in a document constant, aiming at standardization of the description.

CITATION LIST

Patent Literature

[PTL 1] Japanese Unexamined Patent Application Publication No. 2009-087216
[PTL 2] Japanese Unexamined Patent Application Publication No. 2009-146121

SUMMARY OF INVENTION

However the related technologies mentioned above decide an optimal anonymization process and execute the process they cannot control application sequences of the anonymization process flexibly. Accordingly, the technology described in PTL 1 had the following problem. That is, the problem is, even in case utilization requirements of anonymized information are different, each anonymization, satisfying same anonymity, derives same results. Also, in the system described in PTL 2, the priority of items to be anonymized is decided implicitly. As a result, there was a problem that, by the technology of PTL 2, service providers had to realize anonymization for each use case.

The object of the present invention is to provide a technology which solves the problems mentioned above.

In order to achieve the object mentioned above, one exemplary embodiment of a device according to the present invention is an information processing device which makes the personal information anonymized, in case of utilizing personal information is linkable to an individual.

The information processing device includes:

an anonymization policy providing means for providing an anonymization policy in which priority is added to each of a plurality of kinds of anonymization processes to enhance anonymity for at least one item which can be related to the personal information;

an anonymization process selecting means for selecting in sequence from an anonymization process of low priority to an anonymization process of high priority, in case the plurality of kinds of anonymization processes being contained in the anonymization policy which the anonymization policy providing means provides is applied;

an anonymization processing means for applying the plurality of kinds of anonymization processes in the sequence selected by the anonymization process selecting means to the personal information which an information user uses; and an anonymity evaluating means for providing the personal information to which the anonymization process was applied up to the anonymization process concerned to the information user, in case it is judged that the personal information to which the anonymization process was applied had anonymity.

In order to achieve the object mentioned above, one exemplary embodiment of a method according to the present invention is a control method of an information processing device which makes the personal information anonymized, in case of using personal information which is linkable to an individual.

A control method of an information processing device which makes the personal information anonymized, in case of using personal information which is linkable to an individual, including:

providing an anonymization policy in which priority is added to each of a plurality of kinds of anonymization process to enhance anonymity for at least one item which can be related to the personal information;

selecting in sequence from an anonymization process of low priority to an anonymization process of high priority, in case the plurality of kinds of anonymization processes included in the anonymization policy to which the priority was added is applied;

applying the plurality of anonymization processes in the selection sequence of the anonymization process to the personal information which an information user uses; and providing the personal information to which the anonymization process was applied up to the anonymization process concerned to the information user, in case it is judged that the personal information to which the anonymization process was applied had anonymity.

In order to achieve the object mentioned above, one exemplary embodiment of a program according to the present invention is a control program of an information processing device which makes the personal information anonymized, in case of using personal information which is linkable to an individual, comprising the process of:

providing an anonymization policy in which priority is added to each of a plurality of kinds of anonymization processes to enhance anonymity for at least one item which can be related to the personal information;

selecting in sequence from an anonymization process of low priority to an anonymization process of high priority, in case the plurality of kinds of anonymization processes included in the anonymization policy provided by providing the anonymization policy is applied;

applying the plurality of anonymization processes in the selection sequence of the anonymization process to the personal information which an information user uses; and providing the personal information to which the anonymization process was applied up to the anonymization process concerned to the information user, in case it is judged that the personal information to which the anonymization process was applied had anonymity.

In order to achieve the object mentioned above, one exemplary embodiment of a system according to the present invention is an information processing system which makes personal information anonymized, in case of using personal information which is linkable to an individual, including:

a personal information acquisition means for acquiring the personal information;

a personal information memory means for storing the acquired personal information;

an anonymization policy providing means for providing an anonymization policy in which priority is added to each of a plurality of kinds of anonymization processes to enhance anonymity for at least one item which can be related to the personal information;

an anonymization process selecting means for selecting in sequence from an anonymization process of low priority to anonymization process of high priority, in case the plurality of kinds of anonymization processes included in the anonymization policy which the anonymization policy providing means provides is applied;

an anonymization processing means for applying a plurality of kinds of anonymization processes in the sequence selected by the anonymization process selecting means to the personal information which is among the personal information stored in the personal information memory means and which an information user uses;

an anonymity evaluating means for providing the personal information to which the anonymization process was applied up to the anonymization process concerned to the information user, in case it is judged that the personal information to which the anonymization process was applied had anonymity; and an anonymization information output means which outputs the personal information provided to the information user.

In order to achieve the object mentioned above, an exemplary embodiment of another method according to the present invention is an anonymization method of personal information which, in case personal information which can be linked to an individual is used, makes the personal information anonymized, and includes:

a personal information acquisition step which acquires the personal information;

an anonymization policy providing step which includes a plurality of kinds of anonymization processes to enhance anonymity for at least one item which can be related to the personal information and provides an anonymization policy in which priority is added to each of the plurality of kinds of anonymization processes;

an anonymization process selection step which, in case the plurality of kinds of anonymization processes included in the anonymization policy which the anonymization policy providing step provides is applied, selects in sequence from an anonymization process of low priority to an anonymization process of which the priority is high;

an anonymization processing step which applies the plurality of kinds of anonymization processes in the sequence selected by the anonymization process selection step to the personal information which is among the personal information stored in the personal information memory means which stores the acquired personal information and which an information user uses;

an anonymity evaluating step which, in case it is judged that the personal information to which the anonymization process was applied had anonymity, provides the personal information to which the anonymization process was applied up to the anonymization process concerned to the information user; and an anonymization information output step which outputs the personal information provided to the information user.

According to the present invention, it becomes possible to freely set an application sequence of the anonymization process generated by combining utilization requirements of the personal information.

BRIEF DESCRIPTION OF DRAWINGS

FIG. 1 is a block diagram showing a structure of an information processing device according to the first exemplary embodiment of the present invention.

FIG. 2 is a block diagram showing a functional structure of an information processing device according to the second exemplary embodiment of the present invention.

FIG. 3A is a block diagram showing a hardware structure of an information processing device according to the second exemplary embodiment of the present invention.

FIG. 4 is a figure showing a structure of a personal information memory unit according to the second exemplary embodiment of the present invention.

FIG. 5 is a figure showing an example of an item rule according to the second exemplary embodiment of the present invention.

FIG. 6 is a figure showing a structure of an anonymization policy according to the second exemplary embodiment of the present invention.

FIG. 7 is a figure showing a structure of an anonymization information memory unit according to the second exemplary embodiment of the present invention.

FIG. 13 is a figure showing data for limited item selection according to the third exemplary embodiment of the present invention.

FIG. 16 is a block diagram showing a functional structure of an information processing device according to the fourth exemplary embodiment of the present invention.

FIG. 19A is a figure explaining a flow of processing after anonymization policy change according to the fourth exemplary embodiment of the present invention.

FIG. 20 is a block diagram showing a functional structure of an information processing device according to the fifth exemplary embodiment of the present invention.

FIG. 22A is a figure explaining integration not having anonymity according to the fifth exemplary embodiment of the present invention.

FIG. 22B is a figure showing a change of process result of integration not having anonymity according to the fifth exemplary embodiment of the present invention.

FIG. 23B is a figure showing a change of process result of integration having anonymity according to the fifth exemplary embodiment of the present invention.

FIG. 24 is a figure showing a change of process result from integration not having anonymity to integration having anonymity according to the fifth exemplary embodiment of the present invention.

FIG. 25 is a block diagram showing a structure of an information processing system including an information processing device according to the sixth exemplary embodiment of the present invention.

DESCRIPTION OF EMBODIMENTS

Figure 3B:
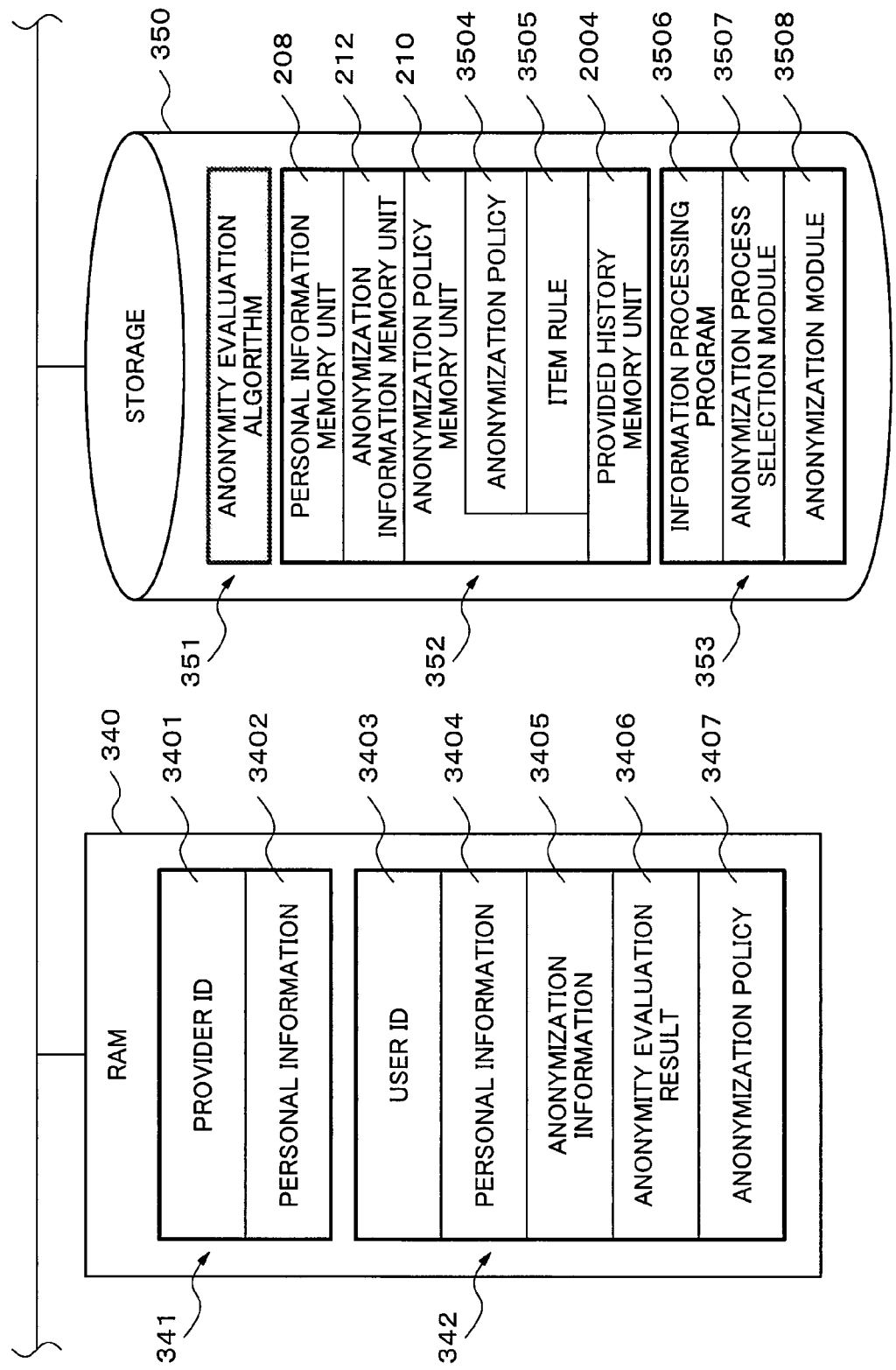
FIG. 3B is a block diagram showing a hardware structure of an information processing device according to the second exemplary embodiment of the present invention.

Hereinafter, exemplary embodiments of the present invention will be explained exemplarily and in detail with reference to drawings. However, components described in the exemplary embodiments below are exemplifications to the utmost and not meant to limit the technological scope of the present invention only to them. Also, in each of the figures below, structures of a part which are not related to an essence of the present invention are omitted, and are not illustrated.

Further, although "anonymization" used in this description includes an anonymization process such as generalization, truncation, separation, permutation and perturbation for personal information with high privacy, but it is not limited to them. Here, "generalization" is a process which makes an item of the personal information ambiguous and hides a detailed value. For example, if it is the generalization to an item "address", it is the process which deletes a house number, a municipality name and so on. "Truncation" is a process which deletes an item from the personal information, and is the process which hides the fact itself that the item is included in the personal information. "Separation" is a process which divides a plurality of items of the personal information of one user into a plurality of personal information, and is the process which prevents personal identification or estimation of an attribute of the user (also referred to as an information provider) becoming possible by combining the items. "Permutation" is a process which prevents personal identification or attributes estimation of the user by a combination of items by exchanging a part or all of the items between a plurality of personal information. "Perturbation" is a process which hides a correct value by adding a certain fluctuation to a value of an item. In particular, each process of separation, permutation and perturbation makes it a main purpose not to provide a personalized service to the individual user but to protect privacy of the user in case of statistical processing.

The First Exemplary Embodiment

An information processing device 100 according to the first exemplary embodiment of the present invention will be explained using FIG. 1. The information processing device 100 is a device which makes the personal information anonymized, in case of using personal information which can be linked to an individual.

As shown in FIG. 1, the information processing device 100 includes an anonymization policy providing unit 102, an anonymization process selecting unit 104, an anonymization processing unit 106 and an anonymity evaluating unit 108. The anonymization policy providing unit 102 includes a plurality of kinds of anonymization processes to enhance anonymity for at least one item which can be related to the personal information. Also, the anonymization policy providing unit 102 provides an anonymization policy in which priority is added to each of the plurality of kinds of anonymization processes. The priority may also be, for example, a value decided in the anonymization policy providing unit 102 according to utilization requirements of the personal information. The anonymization process selecting unit 104, in case a plurality of kinds of anonymization processes included in the anonymization policy which the anonymization policy providing unit 102 provides is applied, selects in sequence from an anonymization process of which the priority is low to an anonymization process of which the priority is high. The anonymization processing unit 106 applies the plurality of kinds of anonymization processes in the sequence selected by the anonymization process selecting unit 104 to the personal information. The anonymity evaluating unit 108, in case it is judged that the personal information to which the anonymization process was applied respectively had anonymity, provides the personal information to which the anonymization process having the anonymity concerned was applied to an information user.

According to the exemplary embodiment, it becomes possible to freely set an application sequence of the anonymization process generated by combining utilization requirements of the personal information variously.

The Second Exemplary Embodiment

An information processing device of the second exemplary embodiment according to the present invention, in case personal information provided from an information provider is provided to an information user, corresponding to the information user, executes anonymization by an anonymization policy including a plurality of kinds of anonymization processes to which priority is added. In the case, each anonymization process can create the anonymization policy so that anonymization of a plurality of items of the personal information may be included.

According to this exemplary embodiment, it becomes possible to freely set an application sequence of the anonymization process generated by combining utilization requirements of the personal information. Further, according to this exemplary embodiment, the anonymization process can also be applied to a plurality of items of the personal information in the sequence according to the priority described in the anonymization policy. Accordingly, the information processing device of the second exemplary embodiment can provide speedily the personal information made anonymized according to the use of the information user. That is, by this exemplary embodiment, speedy anonymization corresponding to the information user of the personal information becomes possible than one which applies each anonymization process to the item and evaluates anonymity. Further, according to each exemplary embodiment below, although an example which applied the information processing system and information processing device to a medical field in which the anonymization process is indispensable is shown, application field is not limited to the medical field and is applicable to all fields in case identification of a person, a thing, a location and so on causes disadvantages.

<Structure of the Information Processing Device of the Second Exemplary Embodiment>

FIG. 2 is a block diagram showing a functional structure of an information processing device 200 according to the second exemplary embodiment of the present invention. The information processing device 200 which is a step-by-step anonymization device includes: an anonymization process selecting unit 202, an anonymization processing unit 204, an anonymity evaluating unit 206, a personal information memory unit 208, an anonymization policy memory unit 210 and an anonymization information memory unit 212.

Further, the information processing device 200 is a device exemplified as a computer. Each element (function block) in the information processing device 100 and other information processing devices for anonymization mentioned below is realized by a program (software) which realizes components in such as FIG. 2 using hardware of the computer. Such information processing device 200 can be realized by a computer which includes, for example, a CPU (Central Processing Unit), a memory (main memory), a hard disk (large-volume auxiliary memory device) and a communication device, and which is connected to an input device such as a keyboard and a mouse and an output device such as a display and a printer. And the information processing device 200 can realize each function of anonymization process selecting unit 202 to anonymization information memory unit 212 mentioned above by the CPU reading the program stored in the hard disk into the memory and executing it. It can be understood by a person concerned that there exist various examples of modification in its realization method and devices. Each figure explained below shows not a structure of hardware unit but blocks of function unit. An example of a hardware structure of this information processing device 200 is shown in FIG. 3A and FIG. 3B mentioned below.

The personal information memory unit 208 stores the personal information provided from an information provider (though it is a terminal device, it will be referred to as an information provider hereinafter) or information including the personal information. The personal information is an item including a name and a value and is information including at least one item to which the anonymization process such as generalization, truncation, separation, permutation and perturbation can be applied no smaller than once. As an example of the item, an item as "address" which has a character string including a prefecture name, a municipality name, a house number and so on as a value, an item as "age" which has a numerical value as a value and so on can be considered (refer to FIG. 4 for a concrete example). The personal information stored in the personal information memory unit 208 does not limit anonymization processes which can be executed or services which can be applied.

The anonymization policy memory unit 210 stores the anonymization policy. The anonymization policy is a rule for anonymization on utilizing the personal information to which no smaller than zero times of anonymization process was performed. The anonymization process using the anonymization policy includes, about the item of which the personal information is composed, priority of an index for such as presence or absence of the item, abstraction level of the item and accuracy of the item. For example, suppose a case where the personal information is information including the items as address and age, and an index is given by item. For example, for the address, index 1=all, index 2=other than house number and index 3=prefecture name only, and for the age index 1=all and index 2=none are supposed as the index respectively. In this case, each anonymization process of the anonymization policy is described by a set of the address and the age such as priority 3 (address: index 1, age: index 1), priority 2 (address: index 2, age: index 1) and priority 1 (address: index 2, age: index 2) (refer to FIG. 6 and FIG. 13 for a concrete example).

The anonymization information memory unit 212 stores the personal information to which an information user ID which is an identifier to identify the information user is given or the personal information made anonymized (refer to FIG. 7 for a concrete example).

The anonymization process selecting unit 202 refers to the anonymization policy stored in the anonymization policy memory unit 210 and takes out the information user ID included in the anonymization policy. And, in case a latest personal information to which the information user ID is given does not exist in the anonymization information memory unit 212, the anonymization process selecting unit 202 copies all latest personal information stored in the personal information memory unit 208 to the anonymization information memory unit 212 and gives the information user ID. Next, the anonymization process selecting unit 202 takes out a set, which is described in the anonymization policy for each item which composes the personal information, which is composed of no smaller than one item name and an index, and of which the priority is lowest. And the anonymization process selecting unit 202 identifies the anonymization process to satisfy the index for each item and hands over the personal information, the item name and contents of the anonymization process to the anonymization processing unit 204. The anonymization process selecting unit 202 executes this processing to all the personal information which is stored in the anonymization information memory unit 212 and to which the information user ID is given.

The anonymization processing unit 204 receives the personal information, the item name and the contents of the anonymization process from the anonymization process selecting unit 202. Next, the anonymization processing unit 204 applies the anonymization process which was designated to the item of the received personal information and generates the personal information made anonymized. And, the anonymization processing unit 204 overwrites the personal information stored in the anonymization information memory unit 212 by the personal information made anonymized.

The anonymity evaluating unit 206 evaluates whether the personal information made anonymized by the anonymization processing unit 204 has anonymity by the following conditions. For example, they are:

It cannot be distinguished from the personal information made anonymized by the anonymization processing unit 204 who the information provider is;

The personal information made anonymized by the anonymization processing unit 204 cannot be distinguished from other personal information stored in the anonymization information memory unit 212;

An attribute of the information provider can not be known from the personal information made anonymized by the anonymization processing unit 204, and so on. And, in case all the personal information which the information user requests has anonymity, the personal information is provided to the information user. On the other hand, in case all or part of the personal information does not have anonymity, it is directed to the anonymization process selecting unit 202 to apply further anonymization process to the personal information.

<Hardware Structure of the Information Processing Device of the Second Exemplary Embodiment>

FIG. 3A and FIG. 3B are figures showing a hardware structure of the information processing device 200 of this exemplary embodiment.

In FIG. 3A, a CPU 310 is a processor for arithmetic control and realizes each functional structure unit of FIG. 2 by executing a program. A ROM (Read Only Memory) 320 stores fixed data and a program such as an initial data and a program. A communication control unit 330 communicates with an external device via a network. The communication control unit 330 receives the personal information by the information provider from the external device and provides (transmits) the personal information to the information user of the external device. Communication may be wireless or may be wired. Further, this information processing device 200 can be considered to be connected to a LAN (Local Area Network) and to operate within a limited range. In the case, an input device and an output device which are not illustrated are connected via an input interface and an output interface which are not illustrated.

A RAM (Random Access Memory) 340 is a random access memory which the CPU 310 uses as a work area of temporary memory. The RAM 340 reserves an area which stores provider data 341 from the information provider and a user data 342 for the information user as the data required to realize this exemplary embodiment. Further in detail, as shown in FIG. 3B, as the provider data 341, a provider ID 3401 which identifies the provider and personal information 3402 provided are stored. Also, as the user data 342, a user identification 3403 which identifies the user and a personal information 3404 used are stored. Also, as the user data 342, anonymization information 3405 which is personal information to which the anonymization process is applied and an anonymity evaluation result 3406 which is a result which evaluated anonymity of the anonymization information 3405 are stored. Further, the anonymization information 3405 may overwrite an area of the personal information 3404. Further, as the user data 342, an anonymization policy 3407 to make the personal information 3404 anonymized is stored.

A storage 350 stores an anonymity evaluation algorithm 351, a data memory unit 352 and a program 353 which the CPU 310 executes nonvolatile. Further in detail, as shown in FIG. 3B, the storage 350 includes, as the data memory unit 352, the personal information memory unit 208 which stores the personal information provided by the information provider by making it correspond to the provider ID. Also, the storage 350 includes, as the data memory unit 352, the anonymization information memory unit 212 which stores the personal information which was made anonymized and provided to the information user by making it correspond to the user identification. Also, the storage 350 includes, as the data memory unit 352, the anonymization policy memory unit 210 which stores the anonymization policy by making it correspond to the user identification in advance. That is, it becomes possible to set different anonymization policy depending on access right of the information user and so on. A memory area of the anonymization policy memory unit 210 stores an anonymization policy 3504 registered in advance. Also, an item rule memory unit stores an item rule 3505 which defines an index of each item of which the anonymization policy is composed. Also, the data memory unit 352 includes a provided history memory unit 2004 which is used in the fifth exemplary embodiment and which accumulates the personal information which was made anonymized and provided to the information user by making it correspond to the user identification.

As shown in FIG. 3B, the storage 350 stores an information processing program 3506 which shows an operation procedure of this information processing device 200 as the program 353. Also, the storage 350 stores, as the program 353, an anonymization process selection module 3507 which selects the anonymization process executed from the anonymization policy and an anonymization module 3508 which executes the anonymization process, included in a part of this information processing program 3506.

<Structure of Each Data Used in the Second Exemplary Embodiment>

(Structure of Personal Information Memory Unit)

FIG. 4 is a figure showing a structure of the personal information memory unit 208 of this exemplary embodiment. Such personal information is an example of the personal information in the medical field.

The personal information memory unit 208 stores data of items of a blood relationship 402, an address 403, an age 404 and a medical history 405 by making them correspond to a personal ID 401 which is an identifier of the personal information. In FIG. 4, in order to simplify explanation of a concrete processing of the anonymization hereinafter, as an attribute as the blood relationship 402, a name is stored.

(Structure of Item Rule)

FIG. 5 is a figure showing a structure of the item rule 3505 representing a level of the anonymization for each item as an index. The index 1 is an index of which anonymity is lowest, and the anonymity becomes higher in the sequence of indexes 2, 3 and 4. FIG. 5 is defined corresponding to the concrete example of this exemplary embodiment.

As the index of the blood relationship (name) in the item, as shown in a blood relationship rule data 501 of FIG. 5, the index 1 which describes all and the index 2 which has no description or is expressed by a symbol are defined. As the index of the address in the item, as shown in an address rule data 502 of FIG. 5, the index 1 which describes all, the index 2 which describes other than the house number, the index 3 which describes the prefecture name only and the index 4 which has no description are defined. As the index of the age in the item, as shown in an age rule data 503 of FIG. 5, the index 1 which describes all, the index 2 which describes an age group only and the index 3 which has no description are defined. As the index of the medical history in the item, as shown in a medical history rule data 504 of FIG. 5, the index 1 which describes all, the index 2 which does not describe a special medical history and the index 3 which has no description are defined.

(Structure of Anonymization Policy)

FIG. 6 is a figure showing an example of an anonymization policy 3504 in the anonymization policy memory unit 210. Here, data 601 and 602 shows each anonymization process. In this description, it is supposed that the anonymization process of which numerical value of the priority is larger has lower priority.

In the anonymization policy of FIG. 6, as the anonymization process 601 of which the priority is lowest, the anonymization process is defined which makes the blood relationship (name) anonymized to the index 2, makes the address anonymized to the index 2, makes the age anonymized to the index 2, and does not make the medical history anonymized and leaves it at the index 1 is defined. Next, as the anonymization process 602 of low priority, the anonymization process which leaves the blood relationship (name) at the index 2, makes the address anonymized to the index 3, leaves the age at the index 2 and makes the medical history anonymized to the index 2 is defined.

(Structure of Anonymization Information)

FIG. 7 is a figure showing a structure of the anonymization information memory unit 212 as a result in which the anonymization policy of FIG. 6 and anonymization by item limitation are performed.

The anonymization information of FIG. 7 shows the result which made the personal information of FIG. 4 anonymized. The anonymization information memory unit 212 stores data of items of a blood relationship 702, an address 703, an age 704 and a medical history 705 by making them correspond to a personal ID 701 which is an identifier of the personal information. In FIG. 7, the blood relationship (name) 702 is made anonymized to a symbol "X" and "Y". The address 703 is made anonymized to "Tokyo" which is prefecture name only. The age 704 is made anonymized to "fifties" and "thirties" of the age group. The medical history 705 is made anonymized in a personal ID 001 only to "K-itis". Further, this anonymization information is stored by making it correspond to the user ID of the information user respectively.

<Operation Procedure of the Information Processing Device of the Second Exemplary Embodiment>

Figure 8:
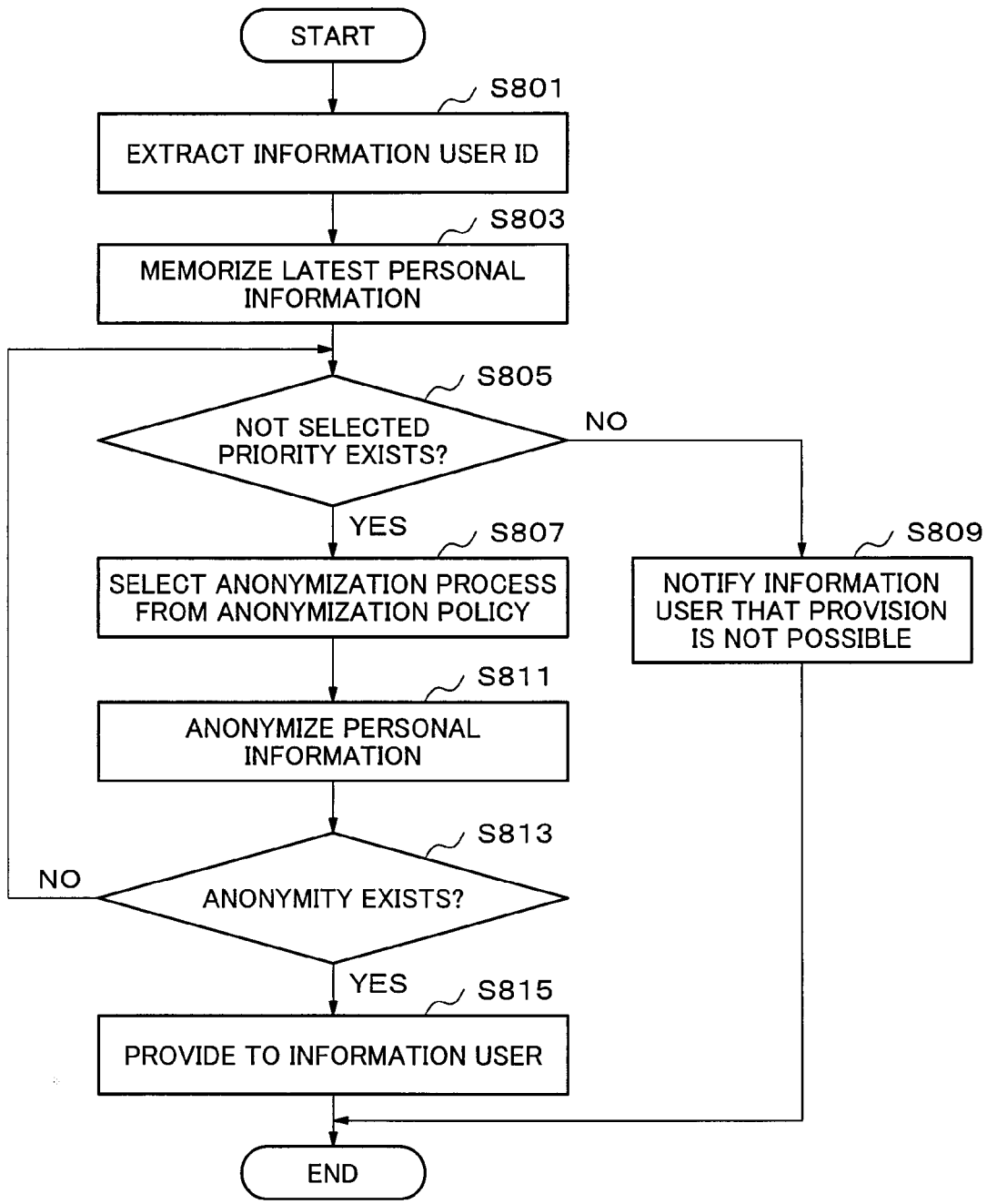
FIG. 8 is a flow chart showing an operation procedure of an information processing device according to the second exemplary embodiment of the present invention.

Next, an operation procedure (data processing method) of the information processing device 200 according to the second exemplary embodiment will be explained. FIG. 8 is a flow chart showing an example of the operation procedure of the information processing device 200 according to the second exemplary embodiment. This flow chart is executed by the CPU 310 of FIG. 3A using the RAM 340, and functions of the functional structure unit shown in FIG. 2 are realized.

In Step S801, First, the anonymization process selecting unit 202 takes out the user ID of the information user, in Step S801. Next, the anonymization process selecting unit 202 reads the latest personal information of the personal information which the information user requests from the personal information memory unit 208, and stores it in the personal information 3404. In Step S805, the anonymization process selecting unit 202 determines whether all the anonymization processes of the anonymization policy corresponding to the user ID are performed depending on whether there exists an anonymization process with priority not selected. When there exists the anonymization process with priority not selected, the processing proceeds to Step S807. The anonymization process selecting unit 202 selects, in Step S807, the anonymization process of which the priority is lowest among the remaining anonymization processes from the anonymization policy. And the anonymization process selecting unit 202 transmits the personal information, the item name and the contents of the anonymization process related to the selected anonymization process to the anonymization processing unit 204. On the other hand, when there exists no anonymization processes with priority not selected, the processing proceeds to Step S809. Since there are no rules of the anonymization process in the anonymization policy any more, anonymization of information did not succeed. In this case, in Step S809, the anonymization process selecting unit 202 notifies the information user to the effect that it cannot provide information.

In Step S811, the anonymization processing unit 204 executes anonymization by a new kind of anonymization process to the personal information which is a result to which the anonymization process so far are performed and overwrites the anonymization information 3405 by the result. In Step 813, the anonymity evaluating unit 206 determines whether there exists anonymity in the personal information of the anonymous process result. When determined that there exists no anonymity, the processing returns to Step S805, and Steps S805-S813 are repeated. When the anonymity evaluating unit 206 determines that there exists anonymity, the processing proceeds to Step S815, and the anonymity evaluating unit 206 provides the personal information which was made anonymized to the information user who the user ID shows.

<Explanation of a Concrete Anonymization Process in the Second Exemplary Embodiment>

An image of the concrete processing in case the anonymization process according to FIG. 8 is performed will be explained using the structure of the information processing device 200 of the second exemplary embodiment and each data mentioned above. The image of the processing shows a degree of abstraction which is one index of anonymization by a bar using FIG. 9, FIG. 10 and FIG. 11A. The bar of each item below is supposed that the shorter, the more abstracted. Also, it is supposed that the personal information includes four items, the blood relationship, the address, the age and the medical history.

(Personal Information which is not Made Anonymized)

Figure 9:
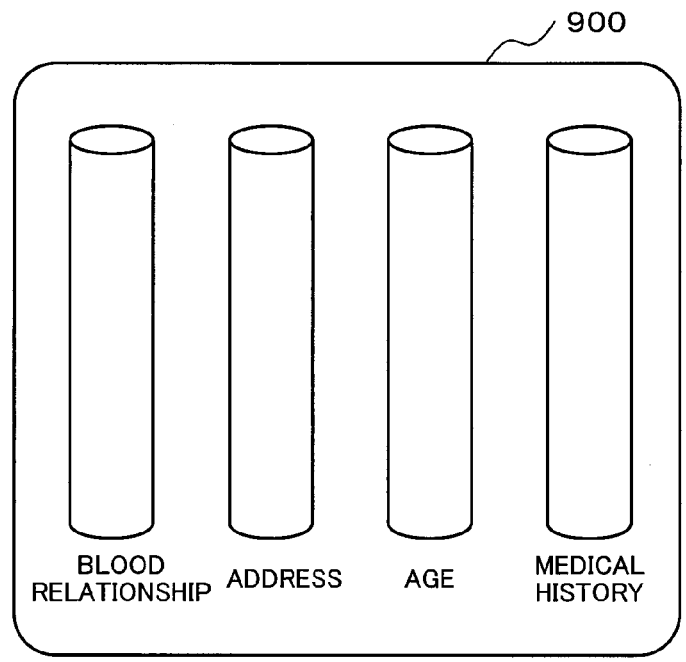
FIG. 9 is a figure which shows personal information according to the second exemplary embodiment of the present invention by abstraction level.

FIG. 9 is a figure showing an abstraction level of the personal information which is provided from the information provider and is not made anonymized yet. Since the anonymization process is not applied yet, in all items, there is no abstraction.

(Anonymization Policy)

Figure 10:
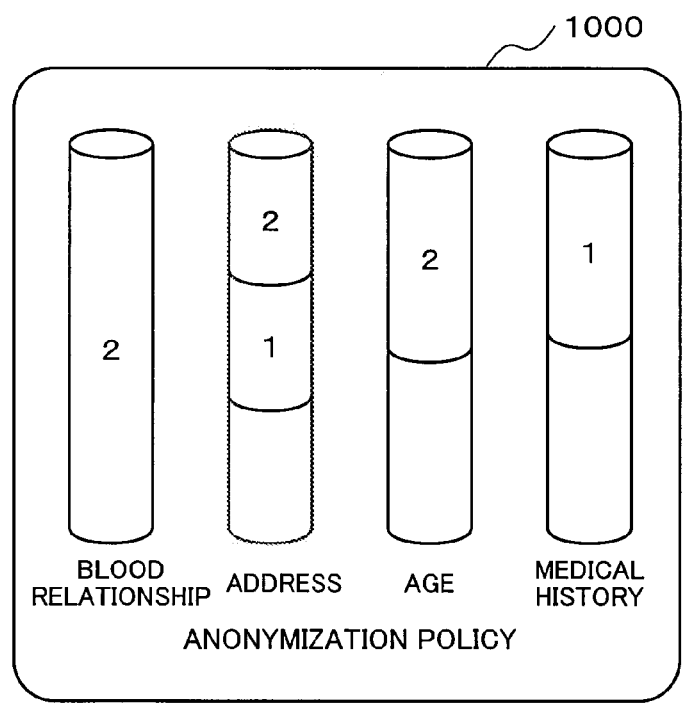
FIG. 10 is a figure which shows an example of an anonymization policy according to the second exemplary embodiment of the present invention by abstraction level.

FIG. 10 is a figure showing a state where the anonymization policy is abstracted by each anonymization process. In the figure, the numbers "1" and "2" show the degree of abstraction by the priority 1 and 2 shown in FIG. 6 respectively. Hereinafter, the numbers "1" and "2" will be explained as the priority 1 and 2. Referring to FIG. 5 and FIG. 6, the items of the blood, the address and the age of the priority 2 are, in FIG. 10, the items for which anonymization is performed first. Changes in the abstraction level by the respective anonymization are shown by a length of the bar in a pillar. In FIG.

10, the items of the address and the medical history of the priority 1 are the items for which anonymization is performed next.

(Anonymization Process)

Figure 11A:
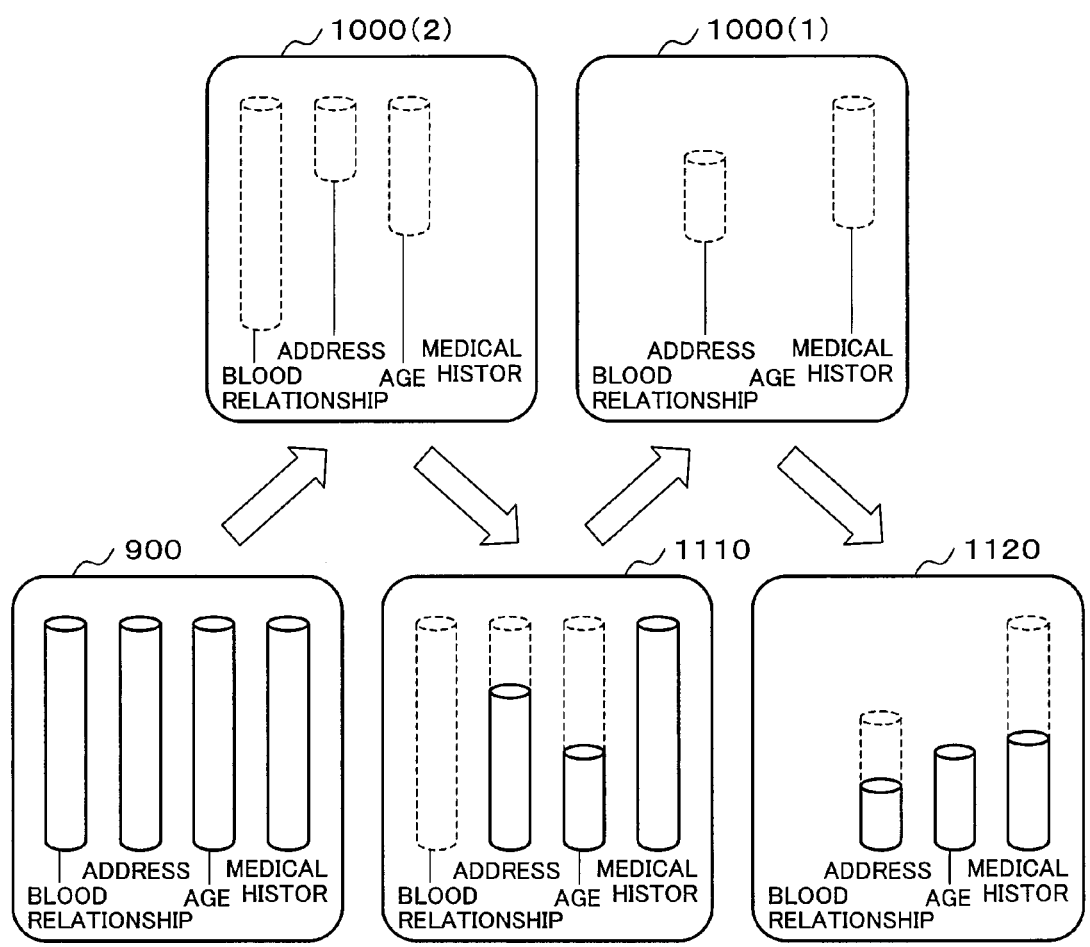
FIG. 11A is a figure explaining a flow of processing according to the second exemplary embodiment of the present invention.

FIG. 11A is a figure showing a state where the abstraction level becomes higher in sequence by the anonymization process of the anonymization processing unit 204.

Personal information 900 which is not made anonymized will be personal information 1110 which is a first anonymization result by an anonymization process 1000 (2) of the priority 2. Next, by an anonymization process 1000 (1) of the priority 1, the personal information 900 will be personal information 1120 of a next anonymization result. Here, anonymization defined by the anonymization policy ends. If it is determined that there exists anonymity in determination of the anonymity by the anonymity evaluating unit 206 in the meantime, the anonymization result having anonymity is outputted as the personal information made anonymized.

Figure 11B:
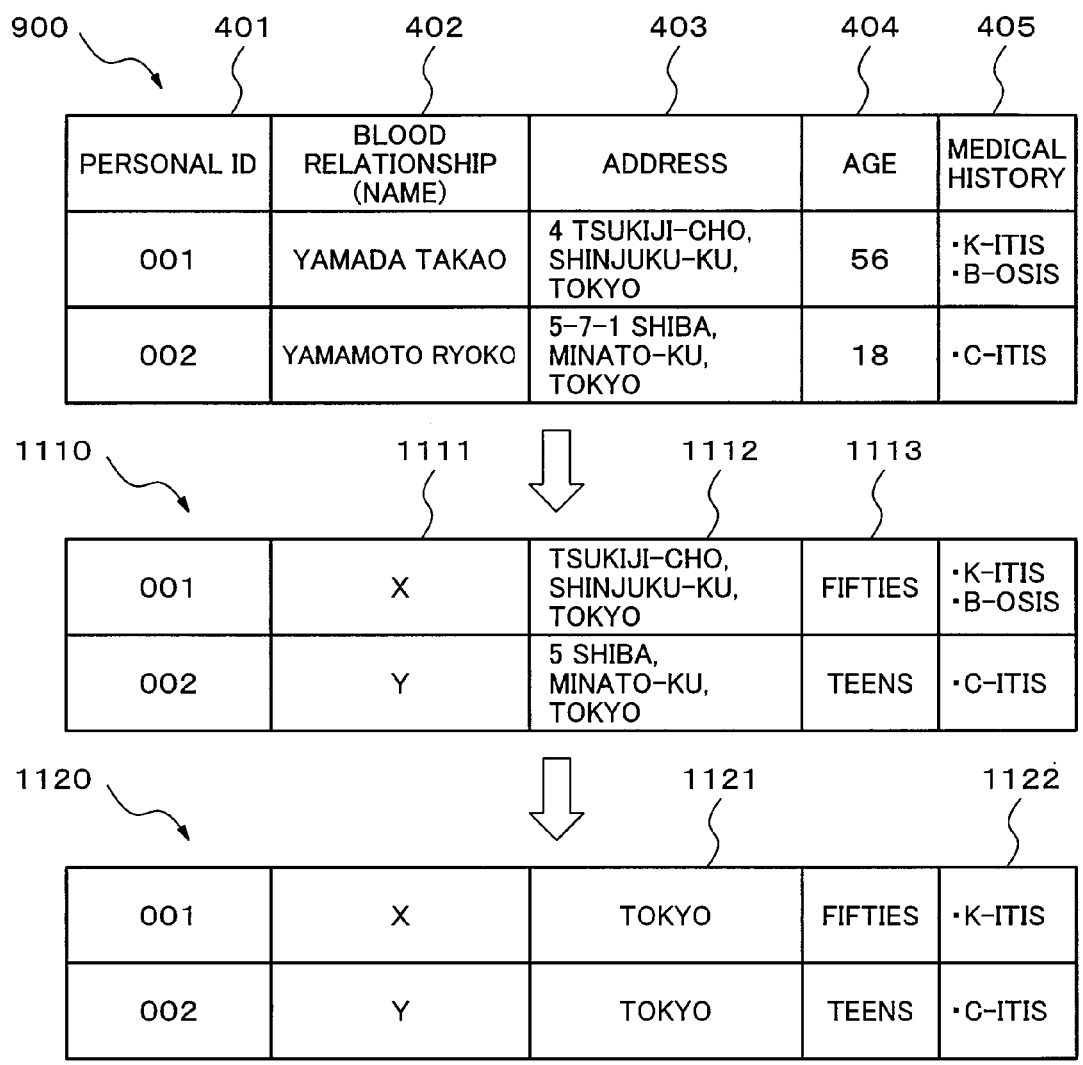
FIG. 11B is a figure showing a change of process result according to the second exemplary embodiment of the present invention.

FIG. 11B is a figure showing changes of a concrete anonymization process result shown in FIG. 11A by the abstraction level. Reference numbers of FIG. 11B correspond to reference numbers for the personal information of the anonymization result in FIG. 11A.

In the personal information 900 of two people in FIG. 4, by the first anonymization process 1000 (2), the blood relationship (name) is replaced by the symbol (X, Y) 1111, the house number and later is deleted in the address (1112), and the age is replaced by the age group 1113. By the next anonymization process 1000 (1), the address other than Tokyo which is the prefecture name only is deleted (1121), and special B-osis is deleted from the medical history of the personal ID 001 (1122).

The Third Exemplary Embodiment

Hereinafter, an information processing device of the third exemplary embodiment of the present invention will be explained in detail. Further, in the following, in case there is a function, a structure or a step which operate same as the second exemplary embodiment, there is a case when the same code is attached in the figure and the explanation in the description may be omitted for them. It is also the same concerning the other exemplary embodiments.

The information processing device 200 in the second exemplary embodiment, in case it executes anonymization by the anonymization process which includes anonymity of a plurality of kinds of items to which the priority is added, executes the anonymization of the plurality of kinds of items simultaneously by one anonymization process. Accordingly, even in case anonymity can be obtained when either of a plurality of kinds of items is made for anonymization in the next step, the information processing device 200 performs the anonymization of the plurality of items simultaneously. Accordingly, in the information processing device 200, there occurs a case when insufficient information is provided to the information user because of excessive anonymization. In order to solve this problem, an information processing device 1200 of the third exemplary embodiment (FIG. 12) does not execute a part of the anonymization processes simultaneously, and performs the anonymization step by step by selecting the items. In particular, the information processing device 1200, after it is judged that the anonymity has been obtained, divides the last anonymization process into items and performs it once again. As a result, the information processing device 1200 of the third exemplary embodiment can leave the information contents as much as possible and can improve services for the information user. Thus, according to this exemplary embodiment, it is possible to provide the personal information which is made anonymized according to the use of the information user, and which kept the information contents as much as is possible.

<Structure of the Information Processing Device of the Third Exemplary Embodiment>

Figure 12:
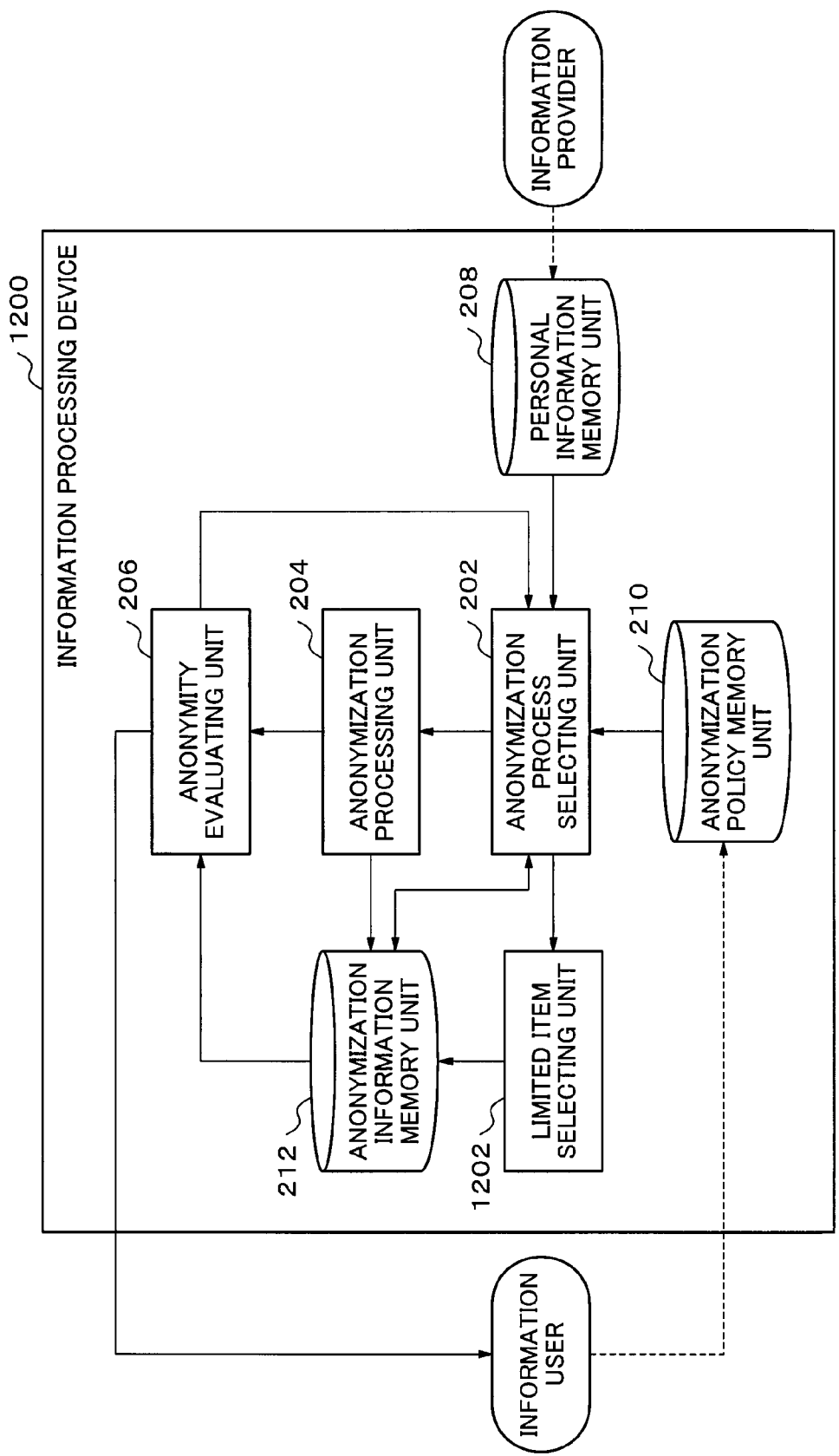
FIG. 12 is a block diagram showing a functional structure of an information processing device according to the third exemplary embodiment of the present invention.

FIG. 12 is a block diagram showing a functional structure of the information processing device 1200 according to the third exemplary embodiment of the present invention. The information processing device 1200 which is a step-by-step anonymization device includes: the anonymization process selecting unit 202, the anonymization processing unit 204, the anonymity evaluating unit 206, the personal information memory unit 208, the anonymization policy memory unit 210, the anonymization information memory unit 212 and a limited item selecting unit 1202.

A point of difference of a structure of the third exemplary embodiment with the second exemplary embodiment is a case that it includes the "limited item selecting unit 1202", and since other functional structure units are the same, their description will be omitted.

The limited item selecting unit 1202, for the anonymization process of the anonymization policy selected by the anonymization process selecting unit 202 and in order to perform finer anonymization, decides the sequence of the item which should be anonymized from a plurality of kinds of items and selects the item. At this time, the limited item selecting unit 1202 may select an item whose change by anonymization process is least and the anonymization process, may select an item of which anonymity becomes highest and an anonymization process, or may select an item and an anonymization process which satisfies both of them. This selection is selected so that the anonymity of the final result is enough and the contents of the personal information may become useful for the information user.

Since the hardware structure of the information processing device 1200 of this exemplary embodiment is same as FIG. 3A and FIG. 3B of the second exemplary embodiment, its explanation will be omitted. However, in this exemplary embodiment, although data for the limited item selecting unit 1202 to perform item selection is not illustrated, it may be added to the anonymization policy 3407 of the RAM 340 or may be added to the anonymization policy 3504 of the storage 350.

<Structure of Data Used in the Third Exemplary Embodiment>

Since data used in the third exemplary embodiment is supposed to be the same as that of the second exemplary embodiment except for data which the limited item selecting unit 1202 uses, its explanation will be omitted.

(Structure of Data which Limited Item Selecting Unit Uses)

FIG. 13 is a figure showing an example of data 1300 which the limited item selecting unit 1202 uses in order to divide a plurality of items of the anonymization processes and performs anonymization in sequence. Here, the limited item selecting unit 1202 divides the anonymization process 602 of FIG. 6 into two of anonymization processes 602-1 and 602-2 and executes them.

In the anonymization process of FIG. 13, first, the anonymization process 602-1 makes only the address anonymized to the index 3, and does not make the medical history anonymized and leaves it at the index 1. Next, the anonymization process 602-2 makes the medical history anonymized to the index 2. Such anonymization process is set in the limited item selecting unit 1202.

<Operation Procedure of the Information Processing Device of the Third Exemplary Embodiment>

Figure 14:
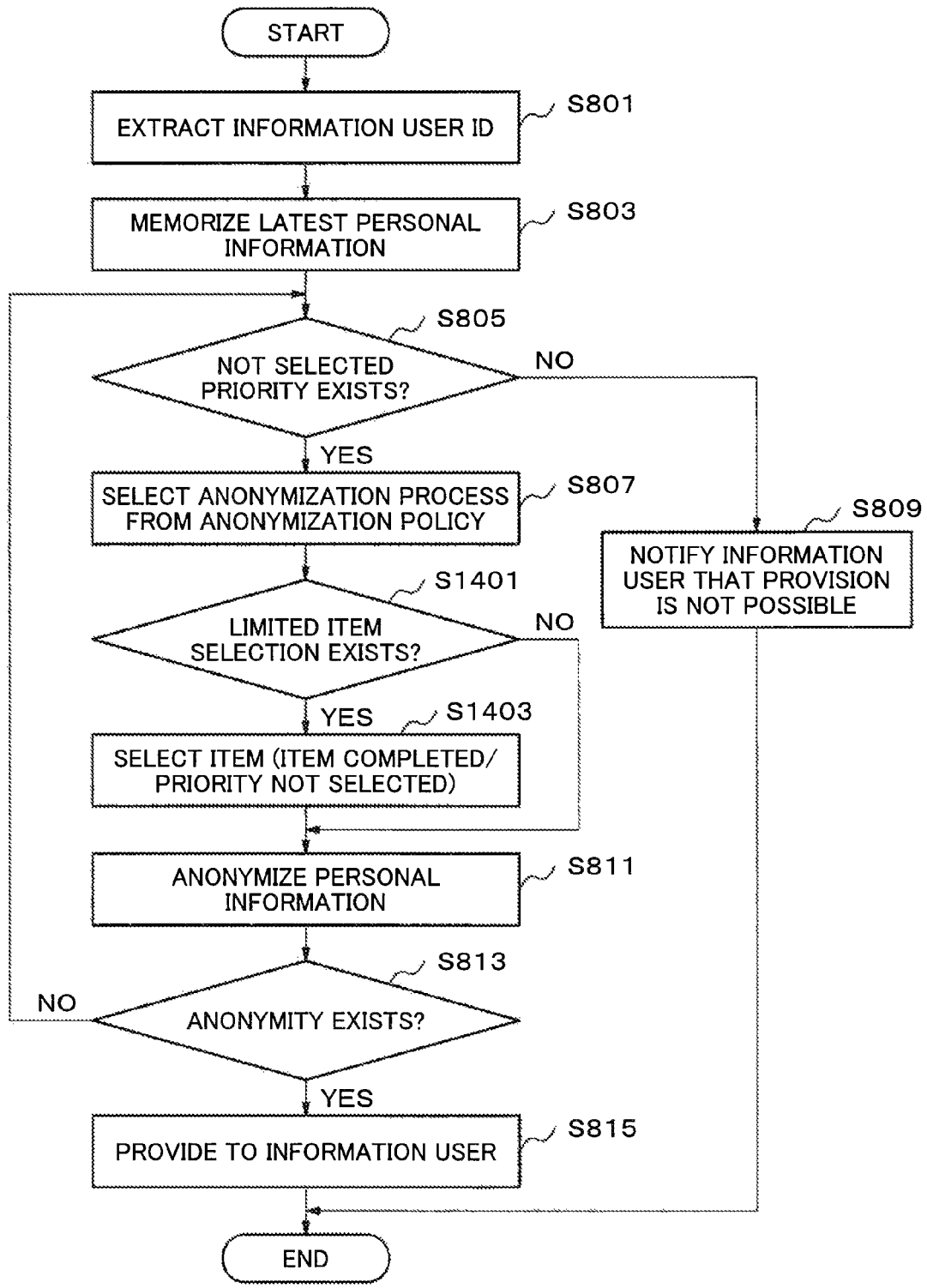
FIG. 14 is a flow chart showing an operation procedure of an information processing device according to the third exemplary embodiment of the present invention.

Next, an operation procedure (data processing method) of the information processing device 1200 according to the second exemplary embodiment will be explained. FIG. 14 is a flow chart showing an example of the operation procedure of the information processing device 1200 according to the third exemplary embodiment. This flow chart is executed by the CPU 310 of FIG. 3A using the RAM 340, and functions of the functional structure unit shown in FIG. 12 are realized. Further, since a point of difference of the flow chart of FIG. 14 with FIG. 8 is addition of Step S1401 and S1403, and other same step numbers as in FIG. 8 are the same processing, their description will be omitted.

In Step S807, the anonymization process selecting unit 202 selects the anonymization process of which the priority is lowest among the remaining anonymization processes from the anonymization policy. In Step S1401, the limited item selecting unit 1202 determines whether limited item selection is performed in the selected anonymization process. In such determination, in case there is data like FIG. 13, or though it is not illustrated in FIG. 14 as it causes complexity, in the last anonymization process which is determined that there exists anonymity, the limited item selecting unit 1202 determines to perform limited item selection. In case limited item selection is not performed, the processing proceeds to Step S811, and the anonymization processing unit 204 performs anonymization of the plurality of kinds of items simultaneously. In case limited item selection is performed, the limited item selecting unit 1202 selects in Step S1403 partial item according to the data like FIG. 13, and after that, executes anonymization of Step S811 to the selected item. Further, in Step S1403, since its priority is maintained as not selected, in Steps S805 and S807, anonymization process of the same priority is selected, and in Step S811, anonymization of the remaining item is performed. For example, in the example of FIG. 13, anonymization by the anonymization process 602-1 will be performed in the first loop and anonymization by the anonymization process 602-2 will be performed in the next loop.

<Explanation of a Concrete Anonymization Process in the Third Exemplary Embodiment>

An image of the concrete processing in case the anonymization process according to FIG. 14 is performed will be explained using the structure of the information processing device 1200 of the third exemplary embodiment and each data mentioned above. The image of the processing shows a degree of abstraction which is one index of anonymization by a bar. The bar of each item below is supposed that the shorter, the more abstracted. Also, it is supposed that the personal information includes four items, the blood relationship, the address, the age and the medical history.

(Anonymization Policy)

The anonymization policy is same as is shown in FIG. 10. However, in this exemplary embodiment, by the limited item selecting unit, the items of the address and the medical history of the anonymization process shown with the priority 1 in FIG. 10 are separated into two steps of anonymization. Here, they are supposed to be priority 1-1 and priority 1-2.

(Anonymization Process)

Figure 15A:
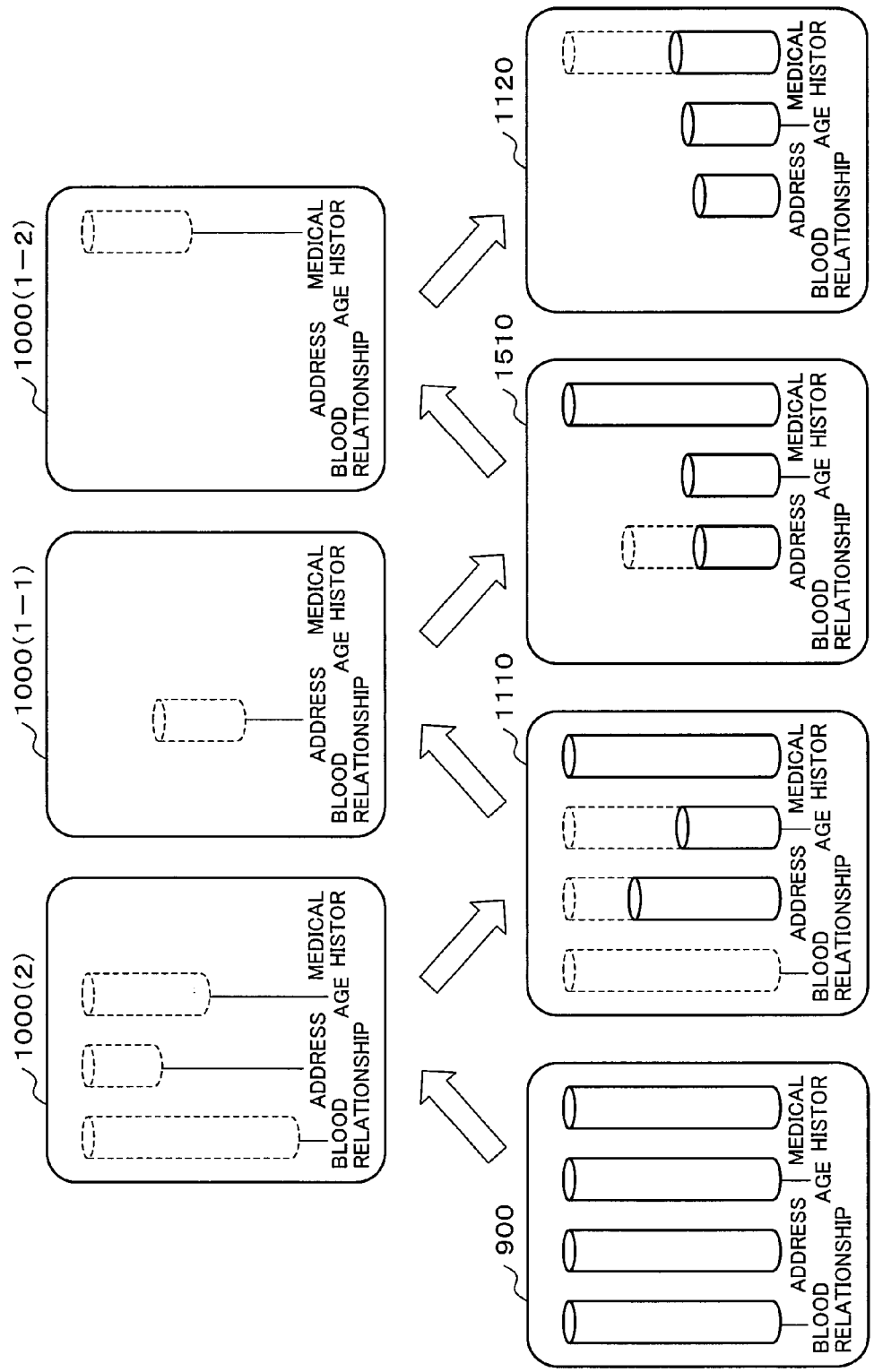
FIG. 15A is a figure explaining a flow of processing by an anonymization policy and limited item selection according to the third exemplary embodiment of the present invention.

FIG. 15A is a figure showing a state where the abstraction level becomes higher in sequence by the anonymization process.

The personal information 900 which is not made anonymized will be the personal information 1110 which is the first anonymization result by the anonymization process 1000 (2) of the priority 2. Next, in the first limited item selection and by the anonymization process 1000 (1-1) of the priority 1-1, anonymization of only the item "address is executed and the personal information 1110 will be personal information 1510 which is the anonymization result. In the next limited item selection, by the anonymization process 1000 (1-2) of the priority 1-2, anonymization of the medical history will be executed and it becomes personal information 1120.

Figure 15B:
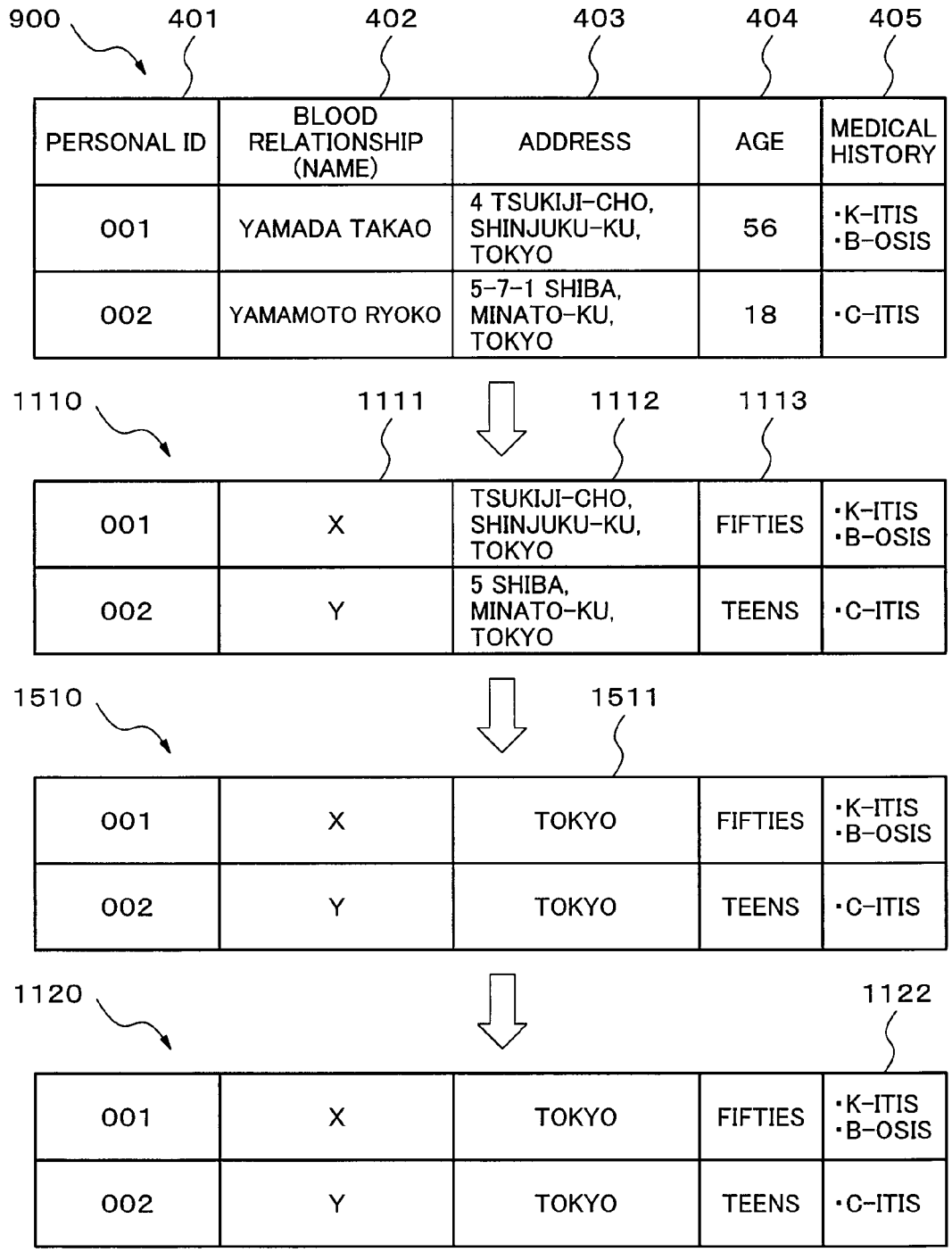
FIG. 15B is a figure showing a change of process result according to the third exemplary embodiment of the present invention.

FIG. 15B is a figure showing changes of a concrete anonymization process result shown in FIG. 15A by the abstraction level. Reference numbers of FIG. 15B correspond to reference numbers for the personal information of the anonymization result in FIG. 15A.

In the personal information 900 of two people in FIG. 4, by the first anonymization process 1000 (2), the blood relationship (name) is replaced by the symbol (X, Y) 1111, the house number and later is deleted in the address (1112), and the age is replaced by the age group 1113. By the next anonymization process 1000 (1-1), the address other than Tokyo which is the prefecture name only is deleted (1511). If not determined that there exists anonymity at this point, further by the anonymization process 1000 (1-2), special B-osis is deleted from the medical history of the personal ID 001 (1122).

The Fourth Exemplary Embodiment

Hereinafter, an information processing device of the fourth exemplary embodiment of the present invention will be explained in detail. Further, in the following, in case there is a function, a structure or a step which operates same as the second and third exemplary embodiments, there is a case when the same code is attached in the figure and the description in the description may be omitted for them.

In the second and the information processing device according to the exemplary embodiment, when anonymity is not satisfied after the anonymization process is applied to all priorities described in the anonymization policy, the personal information is not provided to the information user. However, the information processing device of the third exemplary embodiment differs from the second and third exemplary embodiments in a point that the information user changes the anonymization policy when the anonymity is not satisfied after the anonymization process is applied to all priorities described in the anonymization policy. According to this exemplary embodiment, it becomes possible for the information user to make the personal information anonymized by changing the anonymization policy freely. Accordingly, it is possible to acquire interactively the personal information which has anonymity and is useful for the information user.

<Structure of the Information Processing Device of the Fourth Exemplary Embodiment>

First, a structure of the information processing device according to the fourth exemplary embodiment will be explained. FIG. 16 is a block diagram showing a functional structure of the information processing device 1600 as an anonymization device according to the fourth exemplary embodiment.

An information processing device 1600 includes: the anonymization process selecting unit 202, the anonymization processing unit 204, the anonymity evaluating unit 206, the personal information memory unit 208, the anonymization policy memory unit 210 and the anonymization information memory unit 212 which fulfill the same function as FIG. 2. Further, the information processing device includes: an anonymization information management unit 1602 and an anonymization policy management unit 1604. Hereinafter, structure which differs from the second exemplary embodiment will be explained.

The anonymization information management unit 1602 deletes specific personal information to which the information user ID received from the anonymization process selecting unit 202 is given. The personal information is information which is stored in the anonymization information memory unit 212 and for which anonymity was not obtained. The anonymization policy management unit 1604, in case the personal information does not have anonymity even if the anonymization process selecting unit 202 selects the anonymization process for all priorities described in the anonymization policy, requests the information user to change the anonymization policy. Further, the anonymization policy management unit 1604 accepts the changed anonymization policy from the information user and updates the anonymization policy stored in the anonymization policy memory unit 210. If it is a hardware structure of FIG. 3B, it overwrites the anonymization policy 3407 in the RAM 340, and rewrites the anonymization policy 3504 in the storage 350 or performs additional memorization.

Otherwise, since the hardware structure of the information processing device 1600 of the fourth exemplary embodiment and the structure of each used data are the same as that of the second exemplary embodiment, their description will be omitted.

<Operation Procedure of the Information Processing Device of the Fourth Exemplary Embodiment>

Figure 17:
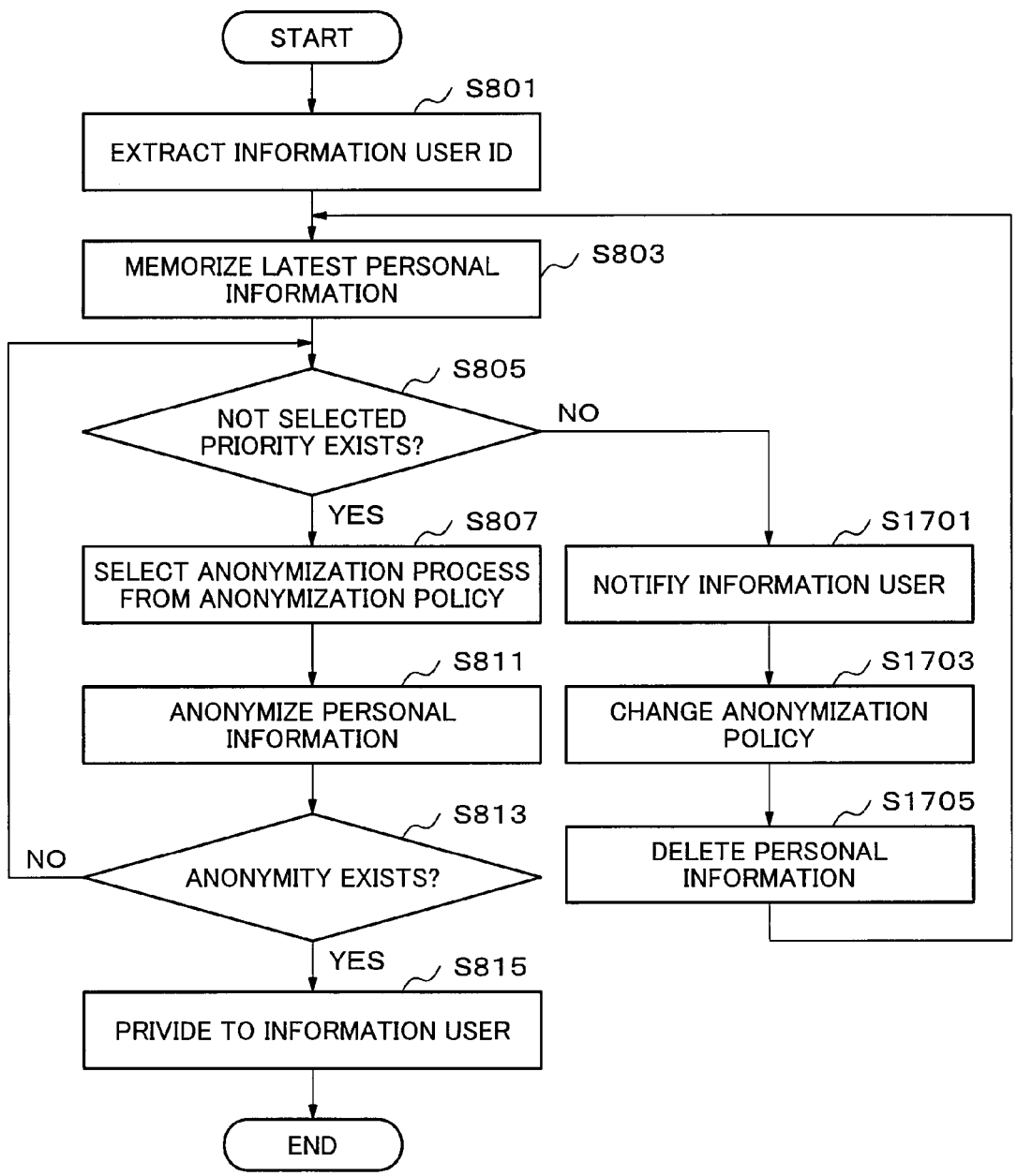
FIG. 17 is a flow chart showing an operation procedure of an information processing device according to the fourth exemplary embodiment of the present invention.

Next, operation of the information processing device 1600 according to the fourth exemplary embodiment will be explained. FIG. 17 is a flow chart showing an example of the operation of the information processing device 1600 according to the fourth exemplary embodiment. Such flow chart is executed by the CPU 310 of FIG. 3A using the RAM 340, and functions of each functional structure unit of FIG. 16 are realized. The operation of the information processing device 1600 shown in FIG. 17 includes the same Steps S801-S807 and S811-S815 as the operation of the information processing device 200 of the second exemplary embodiment shown in FIG. 8. However, it includes Steps S1701-S1705 which are different from the operation of the information processing device 200 of the second exemplary embodiment and are explained below.

In Step S805, in case there exists no anonymization process of the priority not selected in the anonymization policy (NO of S805), the processing proceeds to Step S1701. In Step S1701, the anonymity evaluating unit 206 notifies the information user to the effect that anonymity was not obtained even if all the anonymization processes of the anonymization policy were performed. The anonymization policy management unit 1604 waits for an input or a transmission of the anonymization policy from the information user in response to the notification, and in Step S1703, changes the anonymization policy used so far to the anonymization policy from the information user. And in Step S1705, the anonymization information management unit 1602 deletes the personal information for which the anonymization process was performed by the previous anonymization policy from the anonymization information memory unit 212.

After such processing, the processing returns to Step S803. And the anonymization process selecting unit 202 reads the personal information which should be anonymized and requested by the information user from the personal information memory unit 208 once again, and stores it in the anonymization information memory unit 212. And, the information processing device 1600 executes anonymization by the changed anonymization policy by repeating Steps S805 to S813.

<Explanation of a Concrete Anonymization Process in the Fourth Exemplary Embodiment>

An image of the concrete processing in case the anonymization process is performed will be explained using the structure of the information processing device 1600 of the fourth exemplary embodiment and each data mentioned above. The image of the processing shows a degree of abstraction which is one index of anonymization by a bar. The bar of each item below is supposed that the shorter, the more abstracted. Also, it is supposed that the personal information includes four items, the blood relationship, the address, the age and the medical history.

First, it is supposed that the personal information which is not made anonymized is 900 in FIG. 9 and a figure which expressed the anonymization policy by the abstraction level is 1000 in FIG. 10.

(Anonymization by the First Anonymization Policy)

The first anonymization policy is the anonymization policy 1000 shown in FIG. 10, and progress of the anonymization process is the same as one shown in FIG. 11A. And, it is supposed that, even if all anonymization processes by the anonymization policy 1000 are performed, it was determined that there exists no anonymity by the determination of anonymity.

(Updated Anonymization Policy)

Figure 18:
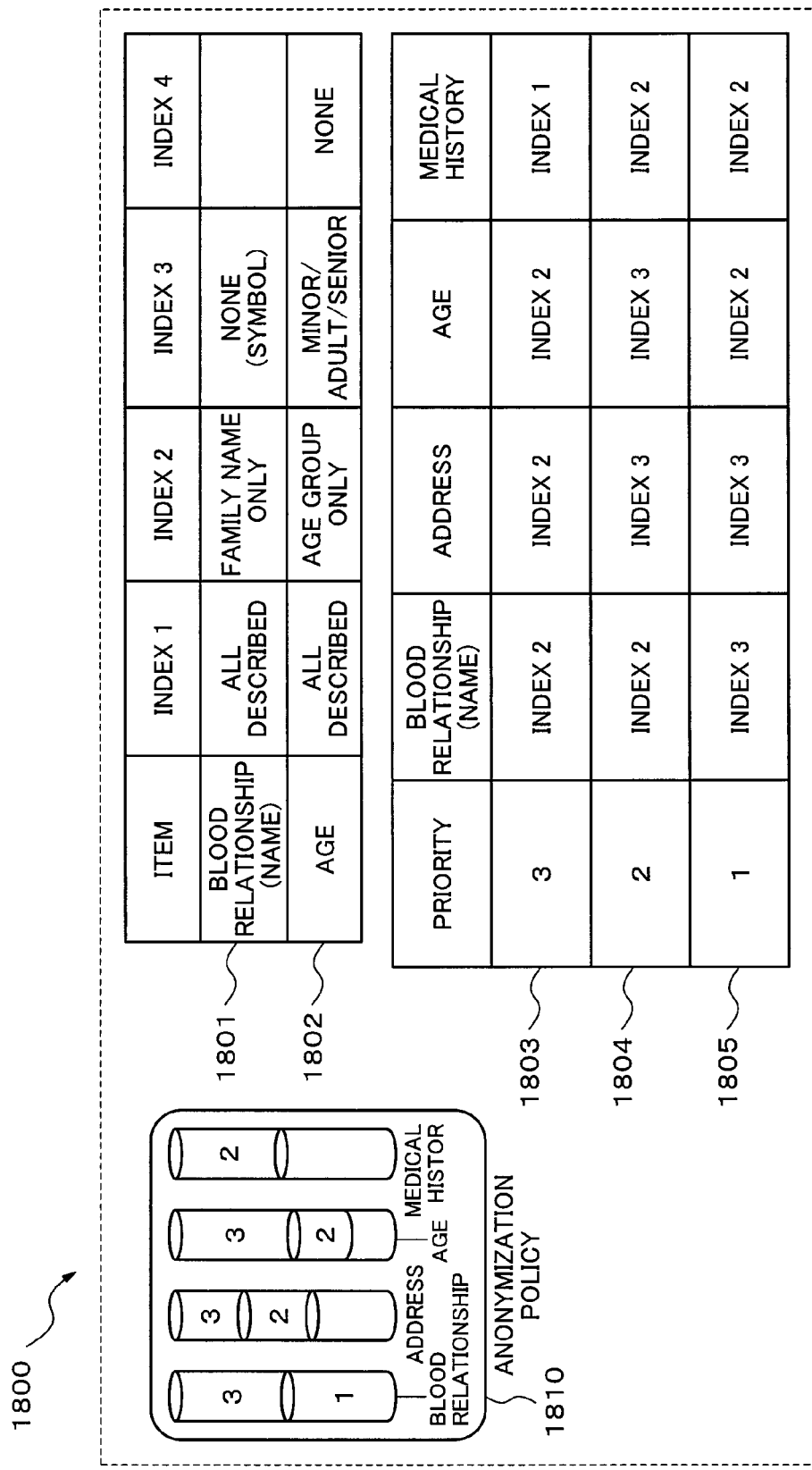
FIG. 18 is a figure showing an example of a changed anonymization policy according to the fourth exemplary embodiment of the present invention.

FIG. 18 is a figure showing an anonymization policy 1800 changed by the information user in Step S1703 of FIG. 17. Such changed anonymization policy 1800 overwrites the anonymization policy 3407 in the RAM 340 of FIG. 3B, and rewrites the anonymization policy 3504 in the storage 350 or performs additional memorization.

In FIG. 18, first, as an item rule of a new anonymization policy, the item of the blood relationship (name) and the item of the age are changed from the item rule 3505 shown in FIG. 5 to like an item rule 1801 and 1802 of FIG. 18. In FIG. 5, the item of the blood relationship (name) has only the index 1 and the index 2; and in the item rules 1801 and 1802, the index 2 which is "family name only" is added newly and all described is supposed to be the index 1, family name only to be the index 2 and no description (or symbol) to be the index 3. Also, though the item of the age had index 1 to index 3, in the item rules 1801 and 1802, the index 3 which is "minor/adult/ senior" is added newly and all described is supposed to be the index 1, age group only to be the index 2, minor/adult/senior to be the index 3 and no description to be an index 4. And, for the anonymization policy, anonymization processes 1803-1805 with the priorities 3 to 1 are defined by using the changes of the item rules.

An anonymization policy 1810 of FIG. 18 is a figure which shows the changed anonymization policy as the state abstracted by each anonymization process. The items of the blood, the address and the age shown in FIG. 18 as the priority 3 are the items for which anonymization is performed first. Changes in the abstraction level by the respective anonymization are shown by a length of the bar. The items of the address, the age and the medical history shown in FIG. 18 as the priority 2 are the items for which anonymization is performed next. The item of the blood relationship being shown in FIG. 18 as the priority 1 is the item for which anonymization is performed finally.

(Anonymization by Updated Anonymization Policy)

FIG. 19A is a figure showing a state of the anonymization process by the updated anonymization policy.

The personal information 900 which is not made anonymized will be personal information 1910 which is the first anonymization result by the anonymization process 1810 (3) of the priority 3. Next, by the anonymization process 1810 (2)

of the priority 2, the personal information 1910 will be personal information 1920 which is the next anonymization result. Finally, by the anonymization process 1810 (1) of the priority 1, the personal information 1920 will be personal information 1930 which is the next anonymization result. The anonymization result in the mean time and having anonymity is outputted as the personal information made anonymized.

Figure 19B:
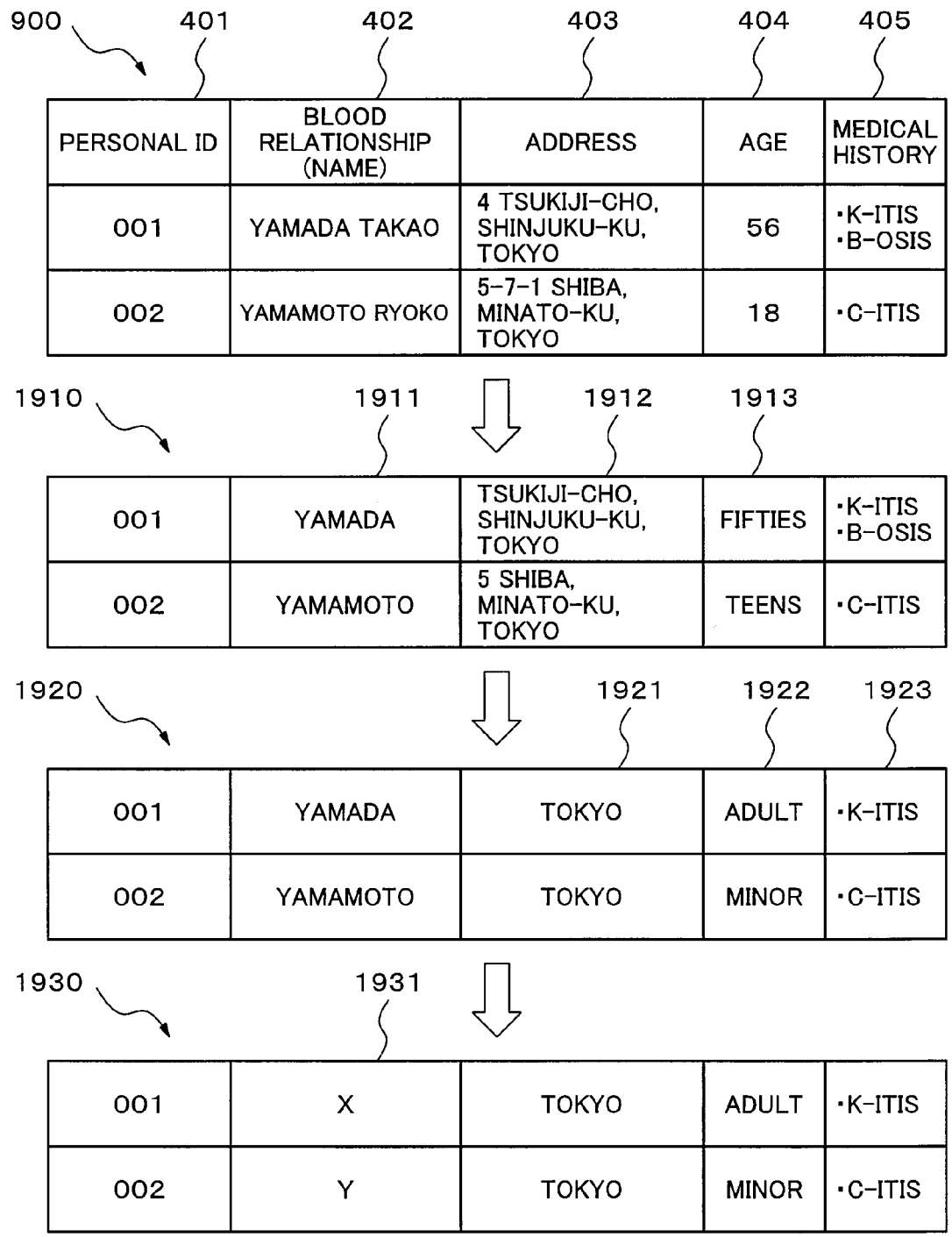
FIG. 19B is a figure showing a change of process result according to the fourth exemplary embodiment of the present invention.

FIG. 19B is a figure showing changes of a concrete anonymization process result shown in FIG. 19A by the abstraction level. Reference numbers of FIG. 19B correspond to reference numbers for the personal information of the anonymization result in FIG. 19A.

In two personal information 900 in FIG. 4, by the first anonymization process 1810 (3), the blood relationship (name) is replaced by family name only 1911, the house number and later is deleted in the address (1912), and the age is replaced by the age group 1913. By the next anonymization process 1820 (2), the address other than Tokyo which is prefecture name only is deleted (1921), the age is replaced by minor/adult/senior 1922, and special B-osis is deleted from the medical history of the personal ID 001 (1923). Finally, by the anonymization process 1810 (1), the blood relationship (name) is replaced by the symbol (X, Y) (1931).

The Fifth Exemplary Embodiment

Hereinafter, an information processing device of the fifth exemplary embodiment of the present invention will be explained in detail. Further, in the following, in case there is a function, a structure or a step which operate same as the second to fourth exemplary embodiments, there is a case when the same code is attached to them and their description in the description may be omitted. In the information processing device according to the second to fourth exemplary embodiments mentioned above, in case the information provider changes the personal information or the information user changes the anonymization policy, there is a concern that, by combining the personal information, the individual can be identified. Accordingly, the information processing device of the fifth exemplary embodiment guarantees that the personal information has anonymization together with the personal information provided to the information user so far. According to this exemplary embodiment, even in case the information user has changed the anonymization policy or in case the information provider changes the personal information, it is possible to prevent the information user from identifying the individual.

<Structure of the Information Processing Device of the Fifth Exemplary Embodiment>

First, a structure of the information processing device as the anonymization device according to the fifth exemplary embodiment will be explained.

FIG. 20 is a block diagram showing a functional structure of an information processing device 2000 according to the fifth exemplary embodiment.

The information processing device 2000 includes: the anonymization process selecting unit 202, the anonymization processing unit 204, the anonymity evaluating unit 206, the personal information memory unit 208, the anonymization policy memory unit 210, the anonymization information memory unit 212 and the limited item selecting unit 1202. These fulfill the same function as the third exemplary embodiment. And, the information processing device 2000 of the fifth exemplary embodiment further includes: a connectivity evaluating unit 2002 and a provided history memory unit 2004.

The provided history memory unit 2004 gives the information user ID which represents the information user to the personal information which satisfies the anonymity and the personal information provided to the information user, and stores it. The connectivity evaluating unit 2002 generates integrated personal information by integrating the personal information handed from the anonymity evaluating unit 206 and a provided history stored in the provided history memory unit 2004, and further, confirms whether the integrated personal information has anonymity In case the integrated personal information has anonymity, the connectivity evaluating unit 2002 provides the personal information to the information user, and in case the integrated personal information does not have anonymity, the connectivity evaluating unit 2002 controls the anonymization processing unit 204 once again so that the anonymization process may be applied to the items of which the personal information is composed.

Further, since the hardware structure of the information processing device 2000 of the fifth exemplary embodiment and the structure of each used data are the same as that of the second exemplary embodiment, their description will be omitted. Also, the structure of the personal information made anonymized and stored in the provided history memory unit 2004 is same as the structure of the anonymization information memory unit 212 of FIG. 7.

<Operation Procedure of the Information Processing Device of the Fifth Exemplary Embodiment>

Figure 21:
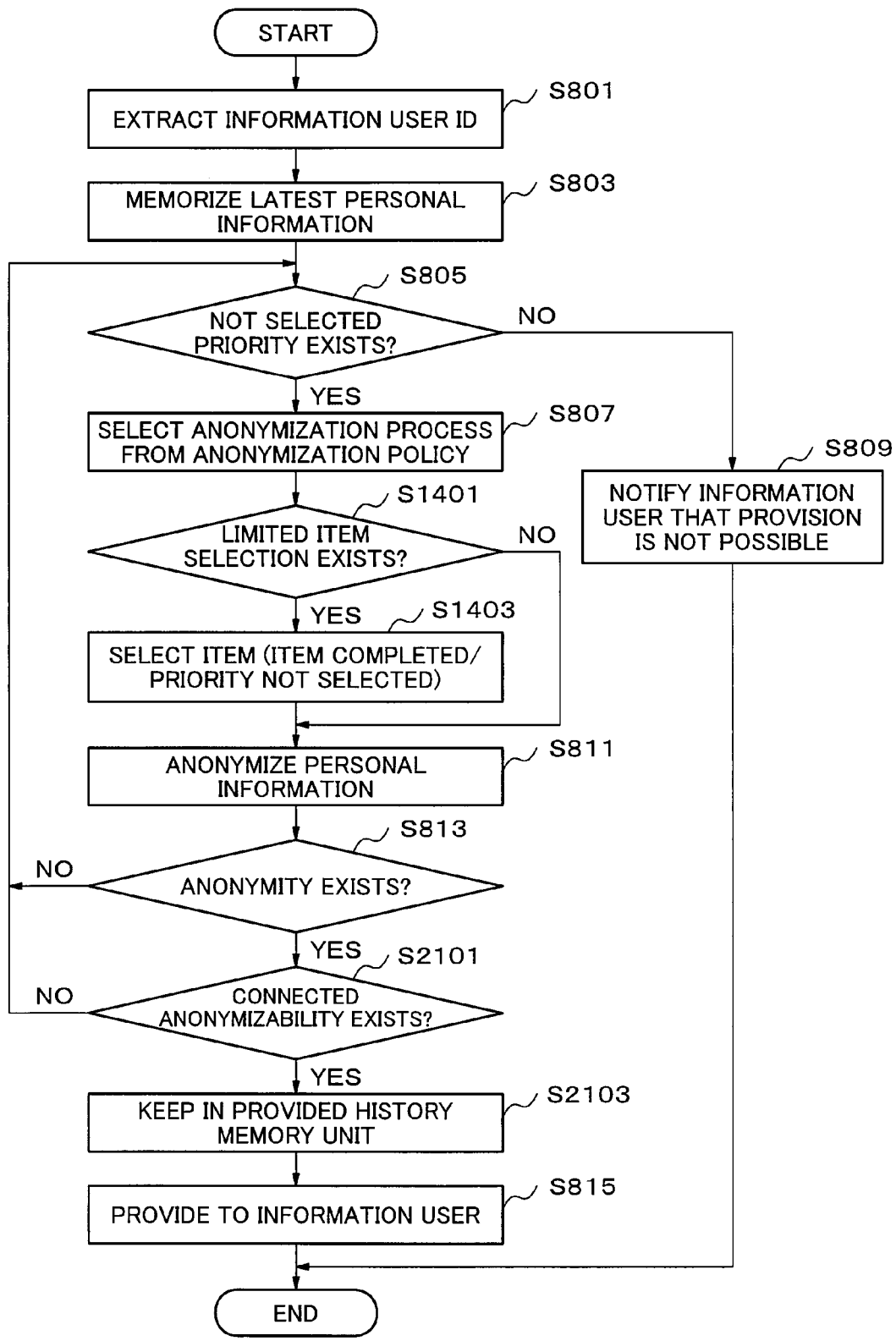
FIG. 21 is a flow chart showing an operation procedure of an information processing device according to the fifth exemplary embodiment of the present invention.

Next, operation of the information processing device 2000 according to the fifth exemplary embodiment will be explained. FIG. 21 is a flow chart showing an example of the operation of the information processing device 2000 according to the fifth exemplary embodiment. Operation of such flow chart is executed by the CPU 310 of FIG. 3A using the RAM 340, and functions of each functional structure unit of FIG. 20 are realized. Operation of the information processing device 2000 shown in FIG. 21 includes the same Steps S801-S815 as the operation of the information processing device 200 shown in FIG. 8 and the same Steps S1401 and S1403 as the operation of the information processing device 1200 shown in FIG. 14. According to the fifth exemplary embodiment, it further includes Step S2101 and S2103 explained below.

In case the anonymity evaluating unit 206 determines that there exists anonymity in Step S813, the connectivity evaluating unit 2002 determines in Step S2101 whether there exists anonymity even if connected with the personal information for which anonymization was already performed. When determined that there exists no anonymity, returns to Step S805, and further, the anonymization process by the anonymization processing unit 204 is performed. When determined that there exists anonymity, proceeds to Step S2103 and the connectivity evaluating unit 2002 gives the information user ID which represents the information user to the personal information which was connected with the personal information for which anonymization was already performed and keeps it in the provided history memory unit 2004.

<Explanation of a Concrete Anonymization Process in the Fifth Exemplary Embodiment>

An image of the concrete processing in case the anonymization process is performed will be explained using the structure of the information processing device 2000 of the fifth exemplary embodiment and each data mentioned above. The image of the processing shows a degree of abstraction which is one index of anonymization by a bar. The bar of each item below is supposed that the shorter, the more abstracted. Also, it is supposed that the personal information includes four items, the blood relationship, the address, the age and the medical history. In this example, by using the result (1510 of FIG. 15) of which anonymity was obtained by the anonymization policy of FIG. 10 and by the processing of the limited item selecting unit 1202, an example which performs anonymization by the anonymization policy of FIG. 18 will be explained.

(Connection of the Anonymization Policy Up to the Item "Address" And "Medical History" of the Priority 2 of FIG. 18)

As shown in FIG. 22A, the connectivity evaluating unit 2002 connects, as the first personal information, the anonymization policy 1000 which obtained the personal information 1510 as the result of which anonymity was obtained in FIG. 11A; and as the second personal information, the anonymization process up to the personal information 2210 which is the anonymization result of FIG. 18; and generates a new anonymization policy. In the connection, the connectivity evaluating unit 2002 selects the anonymization of which the abstraction level is low in each item. The abstraction level of the integrated personal information which is the result of connection becomes like the integrated personal information 2220 of FIG. 22A. That is, in the item of the blood relationship, anonymization of the priority 3 in the anonymization policy 1800 is chosen and in the item of the medical history, no anonymization in the anonymization policy 1000 is chosen.

FIG. 22B is a figure showing changes of a concrete anonymization process result shown in FIG. 22A by the abstraction level. Reference numbers of FIG. 22B correspond to reference numbers for the personal information of the anonymization result in FIG. 22A.

The connectivity evaluating unit 2002 integrates the personal information 1510 which was already made anonymized by the anonymization policy 1000 and the personal information 2210 which was made anonymized by the anonymization policy 1800 up to the items "address" and "medical history" of the priority "2"; and generates the integrated personal information 2220. In the integrated personal information 2220, the item of the blood relationship maintains the contents of the personal information 2210, and the item 2221 of the medical history will be the contents of the personal information 1510.

The connectivity evaluating unit 2002 evaluates whether this integrated personal information 2220 has anonymity against the personal information 1510 which is in the provided history memory unit 2004 and was made anonymized, and the personal information 2210 which is currently under anonymization. When the integrated personal information 2220 has anonymity, the connectivity evaluating unit 2002 stores the integrated personal information 2220 in the provided history memory unit 2004 as the personal information made anonymized and provides it to the information user. In case it does not have anonymity, the connectivity evaluating unit 2002 directs the anonymization processing unit 204 to further perform the anonymization process.

(Connection of the Anonymization Policy Up to the Priority 2 of FIG. 18)

Figure 23A:
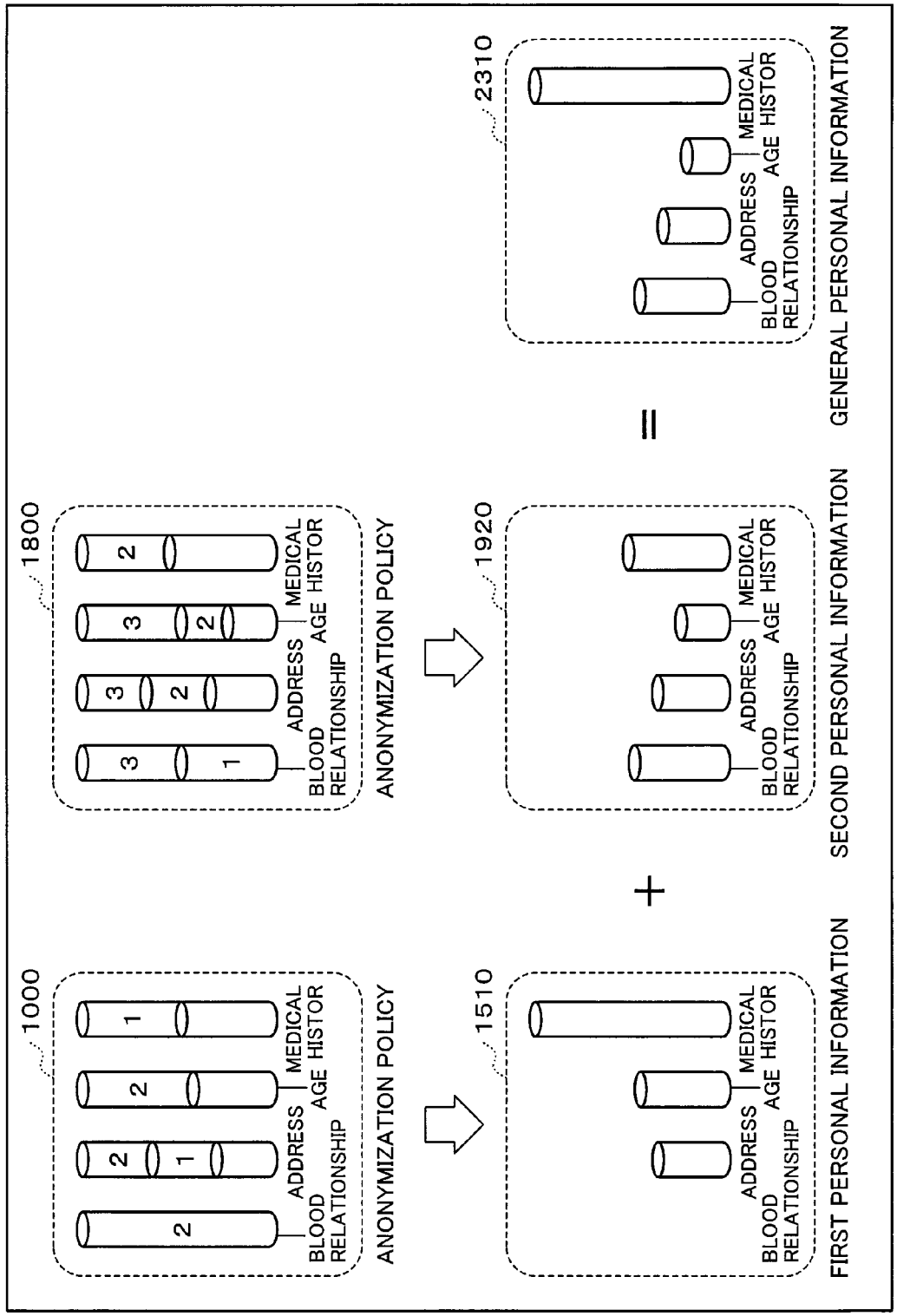
FIG. 23A is a figure explaining integration having anonymity according to the fifth exemplary embodiment of the present invention.

FIG. 23A is a figure showing a connection of the anonymization process in case of not having anonymity in FIG. 22A and FIG. 22B. In FIG. 23A, the priority 2 of the anonymization policy 1800 is executed up to the end, and as the third personal information, the personal information 1920 which is the anonymization result of FIG. 19A is obtained. At that time, it will be integrated personal information 2310.

FIG. 23B is a figure showing changes of a concrete anonymization process result shown in FIG. 23A by the abstraction level. Reference numbers of FIG. 23B correspond to reference numbers for the personal information of the anonymization result in FIG. 23A. The personal information 1510 which was already made anonymized by the anonymization policy 1000 and the personal information 1920 which was made anonymized up to the priority 2 by the anonymization policy 1800 are integrated and the integrated personal information 2310 is generated. In the integrated personal information 2310, the age item 2311 is made anonymized from the age group only of FIG. 22B to "minor/adult/senior".

The connectivity evaluating unit 2002 evaluates whether this integrated personal information 2310 has anonymity against the personal information 1510 which is in the provided history memory unit 2004 and was made anonymized, and the personal information 1920 which is currently under anonymization. In this example, as it has anonymity, the integrated personal information 2310 is, as the personal information which was made anonymized, stored in the provided history memory unit 2004 and provided to the information user.

FIG. 24 is a figure showing changes from the integrated personal information 2220 of FIG. 22B to the integrated personal information 2310 of FIG. 23B. In this example, although there exists no anonymity in the integrated personal information 2220, though in the integrated personal information 2310, there exists anonymity.

The Sixth Exemplary Embodiment

In the second to fifth exemplary embodiments mentioned above, a structure was explained in which the information processing device executes intensively holding of the personal information from the information provider, anonymization and provision of the personal information made anonymized to the information user. The sixth exemplary embodiment shows a structure in which holding of the personal information from the information provider, anonymization and provision of the personal information made anonymized to the information user are respectively or in part processed distributed. According to this exemplary embodiment, by separating accumulation of the personal information from the information provider and the information processing device specialized as an anonymization device, the anonymization process can be applied in wide range.

FIG. 25 is a figure showing a structure of an information processing system 2500 including an information processing device 2501 specialized as the anonymization device.

The information processing system 2500 includes: the information processing device 2501 specialized as the anonymization device, an information accumulation device 2502 which accumulates the personal information and communication terminal equipment 2503 which inputs and outputs the personal information connected via a network 2504. The information accumulation device 2502 may receive the personal information from an input-output terminal 2505 via a LAN. In the information processing system 2500 of FIG. 25, the information provider and the information user perform input and output using the communication terminal equipment 2503. As for the inputted personal information, personal information acquisition is performed in respective information accumulation devices 2502, and is accumulated in the personal information memory unit. The personal information on either of the information accumulation devices 2502 which is requested using the communication terminal equipment 2503 is, after being sent to the information processing device 2501 and made anonymized, provided from the communication terminal equipment 2503 by the anonymization information output to the information user who is using it.

Other Exemplary Embodiments

Although the exemplary embodiments of the present invention are explained in detail above, a system or a device which combined separate characteristics included in the respective exemplary embodiments arbitrarily is also included in the category of the present invention.

Also, the present invention may be applied to a system including a plurality of equipment or it may be applied to a device of stand alone. Further, the present invention is applicable in case a control program which realizes the function of the exemplary embodiment is supplied directly or remotely to the system or the device. Accordingly, a control program installed in a computer, a medium which stored the program and a WWW (World Wide Web) server which makes the control program to be downloaded in order to realize the function of the present invention by the computer are also included in the category of the present invention.

Other Expressions of Exemplary Embodiments

While a part or all of the exemplary embodiments mentioned above can be described as the following supplementary notes, they are not limited to the followings.

(Supplementary Note 1)

An information processing device for making personal information anonymized, in case using personal information which is linkable to an individual, including:

an anonymization policy providing means for providing an anonymization policy in which priority is added to each of a plurality of kinds of anonymization processes to enhance anonymity for at least one item which can be related to the personal information;

an anonymization process selecting means for selecting in sequence from an anonymization process of low priority to an anonymization process of high priority, in case the plurality of kinds of anonymization processes being contained in the anonymization policy which the anonymization policy providing means provides are applied;

an anonymization processing means for applying the plurality of kinds of anonymization processes in the sequence selected by the anonymization process selecting means to the personal information which an information user uses; and an anonymity evaluating means for providing the personal information to which the anonymization process was applied up to the anonymization process concerned to the information user, in case it is judged that the personal information to which the anonymization process was applied had anonymity.

(Supplementary Note 2)

The information processing device according to supplementary note 1 further including a personal information memory means for storing the personal information which an information provider provides.

(Supplementary Note 3)

The information processing device according to supplementary notes 1 or 2, wherein the anonymity evaluation means judges that the anonymity exists because the personal information to which the anonymization process was applied by the anonymization processing means cannot be distinguished from personal information which other information providers provided, the information provider cannot be distinguished who he is from the personal information which was made anonymized by the anonymization processing means, or an attribute of the information provider cannot be known from the personal information which was made anonymized by the anonymization processing means.

(Supplementary Note 4)

The information processing device according to either one of supplementary notes 1 to 3 further comprising: an anonymization information memory means which stores the personal information to which the anonymization process was applied by the anonymization processing means, wherein the anonymization processing means, in case the anonymity evaluation means judges that the personal information to which the anonymization process was applied did not have anonymity, applies to the personal information stored in the anonymization information memory means the anonymization process of high priority.

(Supplementary Note 5)

The information processing device according to either one of supplementary notes 1 to 4, wherein each anonymization process included in the anonymization policy includes an index representing either of presence or absence of the at least one item which can be related to the personal information, an abstraction level of the item concerned and a level of accuracy of the item concerned, and the priority of the anonymization process set based on the index concerned (Supplementary Note 6)

The information processing device according to supplementary note 5 further including: an item rule memory means which stores the index representing either of the presence or absence of each item of a plurality of the items, the abstraction level of each item and the level of the accuracy of each item by making it correspond to each item; and an limited item selecting means which selects anonymization of the item set in advance from the anonymization process including anonymization for a plurality of items, and provides it to the anonymization processing means.

(Supplementary Note 7)

The information processing device according to either one of supplementary notes 1 to 6, wherein the anonymization policy providing means includes an anonymization policy memory means which stores the anonymization policy which was made to correspond to the information user, and corresponding to the information user, provides the anonymization policy read from the anonymization policy memory means (Supplementary Note 8)

The information processing device according to either one of supplementary notes 1 to 7, wherein the anonymity evaluation means, in case it judges that the personal information does not have anonymity even by applying the plurality of anonymization processes included in the anonymization policy, includes a notifying means which notifies the information user of the effect; and the anonymization policy providing means provides the anonymization policy which the information user provided in response to the notification of the notifying means.

(Supplementary Note 9)

The information processing device according to either one of supplementary notes 1 to 8 further comprising: a history memory means which stores a set of anonymization processes of a case when the anonymity evaluation means judged that anonymity exists as a history, and a generation means which, in case the anonymity evaluation means judges that the personal information to which the anonymization process was applied had anonymity, combines a set of the present anonymization processes and the set of the anonymization processes stored in the history memory means and generates an anonymization policy including a new set of anonymization processes, wherein the anonymization processing means applies the new set of anonymization processes of the anonymization policy which the generation means generated to the personal information.

(Supplementary Note 10)

The information processing device according to either one of supplementary notes 1 to 9, wherein the anonymization process includes generalization, truncation, separation, permutation and perturbation for the personal information.

(Supplementary Note 11)

A control method of an information processing device which makes the personal information anonymized, in case of using personal information which can be linked to an individual, comprising:

providing an anonymization policy in which priority is added to each of the plurality of kinds of anonymization process to enhance anonymity for at least one item which can be related to the personal information;

selecting in sequence from an anonymization process of low priority to an anonymization process of high priority, in case the plurality of kinds of anonymization processes included in the anonymization policy to which the priority was added is applied;

applying the plurality of anonymization processes in the selection sequence of the anonymization process to the personal information which an information user uses; and providing the personal information to which the anonymization process was applied up to the anonymization process concerned to the information user, in case it is judged that the personal information to which the anonymization process was applied had anonymity.

(Supplementary Note 12)

A control program of an information processing device which, in case personal information which can be linked to an individual is used, makes the personal information anonymized, and the control program which makes a computer execute comprising:

a process which includes a plurality of kinds of anonymization processes to enhance anonymity for at least one item which can be related to the personal information and provides an anonymization policy in which priority is added to each of the plurality of kinds of anonymization process;

a process which, in case the plurality of kinds of anonymization processes included in the anonymization policy provided by providing the anonymization policy is applied, selects in sequence from an anonymization process of low priority to an anonymization process of high priority;

a process which applies the plurality of anonymization processes in the selection sequence of the anonymization process to the personal information which an information user uses; and a process which, in case it is judged that the personal information to which the anonymization process was applied had anonymity, provides the personal information to which the anonymization process was applied up to the anonymization process concerned to the information user;

(Supplementary Note 13)

An information processing system which makes the personal information anonymized, in case of using personal information which is linkable to an individual, and the information processing system comprising:

a personal information acquisition means which acquires the personal information;

a personal information memory means which stores the acquired personal information;

an anonymization policy providing means which includes a plurality of kinds of anonymization processes to enhance anonymity for at least one item which can be related to the personal information and provides an anonymization policy in which priority is added to each of the plurality of kinds of anonymization process;

an anonymization process selecting means which, in case the plurality of kinds of anonymization process included in the anonymization policy which the anonymization policy providing means provides is applied, selects in sequence from an anonymization process of low priority to an anonymization process of high priority;

an anonymization processing means which applies the plurality of kinds of anonymization processes in the sequence selected by the anonymization process selecting means to the personal information which is among the personal information stored in the personal information memory means and which an information user uses;

an anonymity evaluation means which, in case it is judged that the personal information to which the anonymization process was applied had anonymity, provides the personal information to which the anonymization process was applied up to the anonymization process concerned to the information user; and an anonymization information output means which outputs the personal information provided to the information user.

(Supplementary Note 14)

An anonymization method of personal information which makes the personal information anonymized, in case of using personal information which can be linked to an individual, and the anonymization method of personal information comprising:

acquiring the personal information;

providing an anonymization policy in which priority is added to each of said plurality of kinds of anonymization processes to enhance anonymity for at least one item which can be related to said personal information;

selecting in sequence from an anonymization process of low priority to an anonymization process of high priority, in case said plurality of kinds of anonymization process which is included in the anonymization policy provided is applied;

applying said plurality of kinds of anonymization processes in the sequence selected by the step of selecting in sequence to the personal information which is among the personal information stored in the personal information memory means which stores said acquired personal information and which an information user uses;

providing said personal information applied the anonymization process to said information user, in case it is judged that said personal information applied said anonymization process had anonymity; and outputting said personal information provided to said information user.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the priority from Japanese patent application No. 2010-256045, filed on Nov. 16, 2010 the disclosure of which is incorporated herein in its entirety by reference.

The invention claimed is:

1. An information processing device which makes personal information anonymized, in case of using personal information which is linkable to an individual, comprising:

an anonymization policy providing unit which provides an anonymization policy in which priority is added to each of a plurality of kinds of anonymization processes to enhance anonymity for at least one item which can be related to said personal information;

an anonymization process selecting unit which selects in sequence from an anonymization process of low priority to an anonymization process of high priority, in case said plurality of kinds of anonymization processes being contained in said anonymization policy which said anonymization policy providing unit provides is applied;

an anonymization processing unit which applies said plurality of kinds of anonymization processes in said sequence selected by said anonymization process selecting unit to said personal information which an information user uses; and an anonymity evaluating unit which provides said personal information to which said anonymization process was applied up to the anonymization process concerned to said information user, in case it is judged that said personal information to which said anonymization process was applied had anonymity.

2. The information processing device according to claim 1 further comprising:
an anonymization information memory unit which stores said personal information in which the anonymization process was applied by said anonymization processing unit, wherein
said anonymization processing unit applies said anonymization process of high priority to said personal information stored in said anonymization information memory unit, in case said anonymity evaluating unit judged that said personal information which applied said anonymization process being not a luck of anonymity.

3. The information processing device according to claim 1, wherein
each anonymization process in said anonymization policy includes an index representing either of presence or absence of said at least one item which can be related to said personal information, an abstraction level of said item concerned and a accuracy level of said item concerned and said priority of said anonymization process set based on said index concerned.

4. The information processing device according to claim 3 further comprising:
an item rule memory unit which stores said index representing either of said presence or absence of each item of a plurality of said items, said abstraction level of each item and said accuracy level of each item by making it correspond to each item; and
a limited item selecting unit which selects anonymization of said item set in advance from said anonymization process including anonymization for a plurality of items, and providing it to said anonymization processing unit.

5. The information processing device according to claim 1, wherein
said anonymity evaluating unit includes a notifying unit which notifies said information user of effect, in case it judges that the personal information is a luck of anonymity even by applying said plurality of anonymization processes included in said anonymization policy; and
said anonymization policy providing unit provides the anonymization policy which said information user provided in response to the notification of said notifying unit.

6. The information processing device according to claim 1 further comprising:
a history memory unit which stores a set of anonymization processes of a case when said anonymity evaluating unit judged that anonymity exists as a history; and
a generation unit which combines a set of the present anonymization processes and the set of the anonymization processes stored in said history memory unit and generates an anonymization policy which includes a new set of anonymization processes, in case said anonymity evaluating unit judges that the personal information applied said anonymization process had anonymity, wherein
said anonymization processing unit applies said new set of anonymization processes of the anonymization policy which said generation unit generated to said personal information.

7. A control method of an information processing device which makes said personal information anonymized, in case of using personal information which is linkable to an individual, comprising:
providing an anonymization policy in which priority is added to each of a plurality of kinds of anonymization process, including the plurality of kinds of anonymization processes to enhance anonymity for at least one item which can be related to said personal information;
selecting in sequence from an anonymization process of low priority to an anonymization process of high priority, in case said plurality of kinds of anonymization processes included in the anonymization policy to which said priority was added is applied;
applying using the information processing device said plurality of anonymization processes in the selection sequence of said anonymization process to said personal information which an information user uses; and
providing using the information processing device said personal information to which the anonymization process was applied up to the anonymization process concerned to said information user, in case it is judged that the personal information to which said anonymization process was applied had anonymity.

8. A non-transitory computer-readable medium storing a control program of an information processing device which makes said personal information anonymized, in case of using personal information which is linkable to an individual, causing a computer to execute information processes, comprising:
providing an anonymization policy in which priority is added to each of a plurality of kinds of anonymization processes to enhance anonymity for at least one item which can be related to said personal information;
selecting in sequence from an anonymization process of low priority to an anonymization process of high priority, in case said plurality of kinds of anonymization processes included in the anonymization policy provided by providing said anonymization policy is applied;
applying said plurality of anonymization processes in the selection sequence of said anonymization process to said personal information which an information user uses; and
providing said personal information to which the anonymization process was applied up to the anonymization process concerned to said information user, in case it is judged that the personal information to which said anonymization process was applied had anonymity.

9. An information processing system which makes personal information anonymized, in case of using personal information which is linkable to an individual, comprising:

a personal information acquisition unit which acquires said personal information;

a personal information memory unit which stores said acquired personal information;

an anonymization policy providing unit which provides an anonymization policy in which priority is added to each of a plurality of kinds of anonymization processes to enhance anonymity for at least one item which can be related to said personal information;

an anonymization process selecting unit which selects in sequence from an anonymization process of low priority to anonymization process of high priority, in case said plurality of kinds of anonymization processes included in the anonymization policy which said anonymization policy providing unit provides is applied;

an anonymization processing unit which applies a plurality of kinds of anonymization processes in the sequence selected by said anonymization process selecting unit to the personal information which is among the personal information stored in said personal information memory unit and which an information user uses;

an anonymity evaluating unit which provides said personal information to which the anonymization process was applied up to the anonymization process concerned to said information user, in case it is judged that the personal information to which said anonymization process was applied had anonymity; and an anonymization information output unit which outputs said personal information provided to said information user.

10. An anonymization method of personal information which makes said personal information anonymized, in case of using the personal information which is linkable to an individual, comprising the step of:

acquiring said personal information;

providing an anonymization policy in which priority is added to each of said plurality of kinds of anonymization processes to enhance anonymity for at least one item which can be related to said personal information;

selecting in sequence from an anonymization process of low priority to an anonymization process of high priority, in case said plurality of kinds of anonymization process which is included in the anonymization policy provided in said anonymization policy providing step is applied;

applying using the information processing device said plurality of kinds of anonymization processes in the sequence selected by the selecting in sequence to the personal information which is among the personal information stored in the personal information memory unit which stores said acquired personal information and which an information user uses;

providing using the information processing device said personal information applied the anonymization process to said information user, in case it is judged that said personal information applied said anonymization process had anonymity; and outputting said personal information provided to said information user.

11. An information processing device which makes personal information anonymized, in case of using personal information which is linkable to an individual, comprising:

an anonymization policy providing means for providing an anonymization policy in which priority is added to each of a plurality of kinds of anonymization processes to enhance anonymity for at least one item which can be related to said personal information;

an anonymization process selecting means for selecting in sequence from an anonymization process of low priority to an anonymization process of high priority, in case said plurality of kinds of anonymization processes included in said anonymization policy which said anonymization policy providing means provides is applied;

an anonymization processing means for applying said plurality of kinds of anonymization processes in said sequence selected by said anonymization process selecting means to said personal information which an information user uses; and an anonymity evaluating means for providing said personal information to which said anonymization process was applied up to the anonymization process concerned to said information user, in case it is judged that said personal information to which said anonymization process was applied had anonymity.

* * * * *